(12) United States Patent
Gu et al.

(10) Patent No.: US 12,463,471 B2
(45) Date of Patent: Nov. 4, 2025

(54) WIRELESS POWER TRANSMISSION DEVICE AND OPERATING METHOD THEREFOR

(71) Applicant: Samsung Electronics Co., Ltd., Suwon-si (KR)

(72) Inventors: Beomwoo Gu, Suwon-si (KR); Daehyun Kim, Suwon-si (KR); Jaehyun Park, Suwon-si (KR); Kangho Byun, Suwon-si (KR); Sungku Yeo, Suwon-si (KR); Youngho Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/765,065

(22) Filed: Jul. 5, 2024

(65) Prior Publication Data

US 2024/0364147 A1    Oct. 31, 2024

Related U.S. Application Data

(63) Continuation of application No. PCT/KR2022/018407, filed on Nov. 21, 2022.

(30) Foreign Application Priority Data

Jan. 14, 2022 (KR) .................. 10-2022-0005622
Feb. 23, 2022 (KR) .................. 10-2022-0023784

(51) Int. Cl.
*H02J 50/90* (2016.01)
*H02J 50/12* (2016.01)
*H02J 50/80* (2016.01)

(52) U.S. Cl.
CPC .............. *H02J 50/90* (2016.02); *H02J 50/12* (2016.02); *H02J 50/80* (2016.02)

(58) Field of Classification Search
CPC ............. H02J 50/12; H02J 50/80; H02J 50/90
See application file for complete search history.

(56) References Cited

U.S. PATENT DOCUMENTS 8,681,894 B2    3/2014   Mu et al.
9,302,591 B2 *  4/2016   Huang .................... H02J 50/80
(Continued)

FOREIGN PATENT DOCUMENTS

CN        110720505 A      1/2020
KR    10-2012-0134028 A   12/2012
(Continued)

OTHER PUBLICATIONS

International Search Report dated Mar. 2, 2023, issued in International Application No. PCT/KR2022/018407.

*Primary Examiner* — Rexford N Barnie
*Assistant Examiner* — Joseph N Inge
(74) *Attorney, Agent, or Firm* — Jefferson IP Law, LLP

(57) ABSTRACT

A wireless power transmission device is provided. The wireless power transmission device includes a transmission coil including a first member, which has one end and the other end forming a first angle with a plane, and a second member, which is arranged on the plane and is connected to each of the one end and the other end of the first member, an impedance sensor for outputting a voltage value corresponding to an impedance change amount of a resonance circuit, which includes the transmission coil, a magnetic body having a side surface that is dented, the dented side surface facing a portion of the transmission coil, a motor for moving the magnetic body, memory storing one or more computer programs, and one or more processors communicatively coupled to the memory, wherein the one or more computer programs include computer-executable instructions that, when executed by the one or more processors individually or collectively, cause the wireless power trans- (Continued)

mission device to receive the output voltage value from the impedance sensor, calculate the difference value between a reference voltage value and the received voltage value, determine control information about the motor on the basis of the calculated difference value, and drive the motor through the determined control information so as to control the distance between the magnetic body and the portion of the transmission coil.

20 Claims, 29 Drawing Sheets

(56) References Cited

U.S. PATENT DOCUMENTS

| | | | | |
|---|---|---|---|---|
| 9,646,752 | B2* | 5/2017 | Lee | H02J 50/10 |
| 10,122,203 | B2 | 11/2018 | Sankar | |
| 10,944,300 | B2 | 3/2021 | Sieber et al. | |
| 11,283,486 | B1* | 3/2022 | Mcknight | H04B 5/24 |
| 2016/0141885 | A1* | 5/2016 | Tsuda | H02J 50/12 |
| | | | | 307/104 |
| 2016/0226313 | A1* | 8/2016 | Okubo | H02J 50/12 |
| 2017/0350727 | A1* | 12/2017 | Von Dahl | G01D 5/20 |

FOREIGN PATENT DOCUMENTS

| | | |
|---|---|---|
| KR | 10-2013-0020372 A | 2/2013 |
| KR | 10-2018-0086381 A | 7/2018 |
| KR | 10-1892001 B1 | 8/2018 |
| KR | 10-2155678 B1 | 9/2020 |
| KR | 10-2021-0150348 A | 12/2021 |

* cited by examiner

WIRELESS POWER TRANSMISSION DEVICE AND OPERATING METHOD THEREFOR

CROSS-REFERENCE TO RELATED APPLICATION(S)

This application is a continuation application, claiming priority under § 365 (c), of an International application No. PCT/KR2022/018407, filed on Nov. 21, 2022, which is based on and claims the benefit of a Korean patent application number 10-2022-0005622, filed on Jan. 14, 2022, in the Korean Intellectual Property Office, and of a Korean patent application number 10-2022-0023784, filed on Feb. 23, 2022, in the Korean Intellectual Property Office, the disclosure of each of which is incorporated by reference herein in its entirety.

BACKGROUND

1. Field

The disclosure relates to a wireless power transmission device and an operating method of the wireless power transmission device.

2. Description of Related Art

A wireless power transmission device may transmit wireless power to a wireless power reception device (e.g., a smartphone) through resonance. As the wireless power reception device approaches the wireless power transmission device, the inductance of a transmission coil of the wireless power transmission device may decrease due to the metal contained in the wireless power reception device. When the inductance of the transmission coil decreases, the impedance and resonant frequency of a resonance circuit of the wireless power transmission device may change, reducing wireless power transmission efficiency.

The above information is presented as background information only to assist with an understanding of the disclosure. No determination has been made, and no assertion is made, as to whether any of the above might be applicable as prior art with regard to the disclosure.

SUMMARY

An existing wireless power transmission device may compensate for a change in the impedance of a resonance circuit using a switched capacitor circuit and a switched coil circuit, wherein the switched capacitor circuit includes a plurality of power switches and a plurality of capacitors and the switched coil circuit includes a plurality of power switches and a plurality of inductors. A wireless power transmission device in which space wireless charging is available may form a strong magnetic field through a resonance circuit to transmit wireless power to a wireless power reception device at a distance. In order to form a strong magnetic field, a high current may flow and a high voltage may be applied to the resonance circuit. In space wireless charging, the power switches included in the switched capacitor circuit or the switched coil circuit may have limitations in dealing with the high voltage and high current. In addition, in the switched capacitor circuit and the switched coil circuit, a resonant frequency may be changed by the parasitic capacitance of the drain-source of a power switch, a quality (Q) factor of a resonance circuit may be reduced by on-resistance ($R_{ds,on}$) of the power switch, and energy loss may occur.

Aspects of the disclosure are to address at least the above-mentioned problems and/or disadvantages and to provide at least the advantages described below. Accordingly, an aspect of the disclosure is to provide a wireless power transmission device for applying a high voltage to a transmission coil in space wireless charging and compensating for a change in impedance when a high current flows through the transmission coil.

Another aspect of the disclosure is to provide a wireless power transmission device for compensating for a change in impedance by adjusting the distance between a transmission coil and a magnetic body in space wireless charging.

Additional aspects will be set forth in part in the description which follows and, in part, will be apparent from the description, or may be learned by practice of the presented embodiments.

In accordance with an aspect of the disclosure, a wireless power transmission device is provided. The wireless power transmission device includes a transmission coil including a first member forming a first angle with a plane and a second member disposed on the plane and connected to one end and the other end of the first member, a resonance circuit including the transmission coil and a capacitor connected to the transmission coil in series and/or parallel, an impedance sensor configured to detect impedance based on a voltage and a current measured at a first point of the wireless power transmission device, a magnetic body having a dented side surface facing a portion of the transmission coil, a motor configured to move the magnetic body, memory storing one or more computer programs, and one or more processors communicatively coupled to the memory wherein the one or more computer programs include computer-executable instructions that, when executed by the one or more processors individually or collectively, cause the wireless power transmission device to receive, from the impedance sensor, the detected impedance as a voltage value, calculate a difference value between a reference voltage value and the received voltage value, determine control information of the motor based on the calculated difference value, and control the distance between the magnetic body and the portion of the transmission coil by driving the motor through the determined control information.

In accordance with another aspect of the disclosure, an operating method of a wireless power transmission device is provided. The operating method includes, based on a wireless power reception device being positioned in a wireless charging space of the wireless power transmission device and impedance of a resonance circuit of the wireless power transmission device is changed by the wireless power reception device, generating a voltage value corresponding to a change in the impedance of the resonance circuit, calculating a difference value between a reference voltage value and the generated voltage value, determining control information of a motor based on the calculated difference value, and controlling a distance between a magnetic body and a portion of a transmission coil in the resonance circuit by driving the motor through the determined control information, wherein the transmission coil includes a first member having one end and another end, each forming a first angle with a plane, and a second member disposed on the plane and connected to the first member, and wherein the magnetic body has a dented side surface facing the portion of the transmission coil.

In accordance with another aspect of the disclosure, one or more non-transitory computer-readable storage media storing one or more computer programs including computer-executable instructions that, when executed by one or more processors of an electronic device individually or collectively, cause the electronic device to perform operations are provided. The operations include, based on a wireless power reception device being positioned in a wireless charging space of the wireless power transmission device and impedance of a resonance circuit of the wireless power transmission device is changed by the wireless power reception device, generating a voltage value corresponding to a change in the impedance of the resonance circuit, calculating a difference value between a reference voltage value and the generated voltage value, determining control information of a motor based on the calculated difference value, and controlling a distance between a magnetic body and a portion of a transmission coil in the resonance circuit by driving the motor through the determined control information, wherein the transmission coil includes a first member having one end and another end, each forming a first angle with a plane, and a second member disposed on the plane and connected to the first member, and wherein the magnetic body has a dented side surface facing the portion of the transmission coil.

According to various embodiments, a wireless power transmission device may compensate for a change in the impedance of a resonance circuit through the movement of a magnetic body, thereby achieving impedance matching and efficiently performing wireless charging in a three-dimensional (3D) space.

According to various embodiments, a wireless power transmission device may efficiently transmit wireless power to multiple wireless power reception devices positioned in a wireless charging region in a 3D space.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
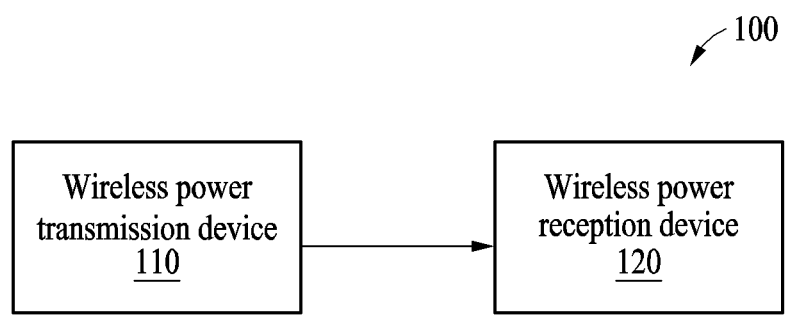
FIG. 1 is a diagram illustrating a wireless power transmission and reception system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces Although terms, such as first, second, and the like are used to describe various components, the components are not limited to the terms. These terms should be used only to distinguish one component from another component. For example, a first component may be referred to as a second component, and similarly the second component may also be referred to as the first component.

It should be noted that if one component is described as being "connected", "coupled", or "joined" to another component, a third component may be "connected", "coupled", and "joined" between the first and second components, although the first component may be directly connected, coupled, or joined to the second component.

It will be further understood that the terms "comprises/comprising" and/or "includes/including" when used herein, specify the presence of stated features, integers, steps, operations, elements, components, or groups thereof, but do not preclude the presence or addition of one or more other features, integers, steps, operations, elements, components or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, the embodiments will be described in detail with reference to the accompanying drawings. When describing the embodiments with reference to the accompanying drawings, like reference numerals refer to like elements and a repeated description related thereto will be omitted.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

FIG. 1 is a diagram illustrating a wireless power transmission and reception system according to an embodiment of the disclosure.

Referring to FIG. 1, a wireless power transmission and reception system 100 may include a wireless power transmission device 110 and a wireless power reception device 120.

According to various embodiments, the wireless power transmission device 110 may transmit wireless power to the wireless power reception device 120. Although FIG. 1 illustrates one wireless power reception device 120, this is only an example, and the wireless power transmission device 110 may transmit wireless power to a plurality of wireless power reception devices.

According to various embodiments, the wireless power reception device 120 may be an electronic device that may receive wireless power. The wireless power reception device 120 may correspond to, for example, a smartphone, a tablet personal computer (PC), a wearable device (e.g., wireless earphones and an electronic watch) but is not limited thereto.

According to various embodiments, the wireless power transmission device 110 and the wireless power reception device 120 may support one or more wireless charging schemes. In an embodiment, the wireless power transmission device 110 may transmit wireless power to the wireless power reception device 120 according to a resonance scheme (e.g., alliance for wireless power (A4WP) (or Air-Fuel alliance (AFA) standards)).

According to various embodiments, the wireless power transmission device 110 may perform space wireless charging by transmitting wireless power to the wireless power reception device 120 positioned in a three-dimensional (3D) space.

According to various embodiments, the wireless power transmission device 110 may transmit or broadcast a beacon signal (e.g., at least one of a short beacon signal and a long beacon signal) through a resonance circuit. The short beacon signal may be, for example, a beacon signal for detecting a load change by an object (e.g., the wireless power reception device 120) positioned in a charging space (or a charging region) of the wireless power transmission device 110. The long beacon signal may be, for example, a beacon signal used by a communication circuit (e.g., a Bluetooth low energy (BLE) communication circuit) of the wireless power reception device 120 to transmit a predetermined signal (e.g., an advertisement signal in a BLE communication method) to the wireless power transmission device 110. When a load change is detected, an advertisement signal is received from the wireless power reception device 120, and/or the reception strength (e.g., received signal strength indication (RSSI)) of the advertisement signal is greater than or equal to a threshold, the wireless power transmission device 110 may detect the wireless power reception device 120.

According to various embodiments, when the wireless power reception device 120 approaches a transmission coil of the resonance circuit of the wireless power transmission device 110, the inductance of the transmission coil of the resonance circuit of the wireless power transmission device 110 may decrease. As the wireless power reception device 120 approaches the transmission coil of the resonance circuit of the wireless power transmission device 110, the inductance of the transmission coil of the resonance circuit of the wireless power transmission device 110 may further decrease. When the inductance of the transmission coil of the resonance circuit of the wireless power transmission device 110 decreases, the impedance and resonant frequency of the resonance circuit of the wireless power transmission device 110 may change.

According to various embodiments, the wireless power transmission device 110 may include a magnetic body and a motor for moving the magnetic body (e.g., ferrite). The wireless power transmission device 110 may compensate for a change in the impedance of the resonance circuit by moving the magnetic body through the motor. For example, the wireless power transmission device 110 may compensate for the decreased inductance of the transmission coil by bringing the magnetic body closer to the transmission coil of the resonance circuit of the wireless power transmission device 110. Accordingly, impedance matching may occur in the wireless power transmission device 110, and wireless power transmission may be performed at a resonant frequency (e.g., 6.78 megahertz (MHz)).

Figure 2:
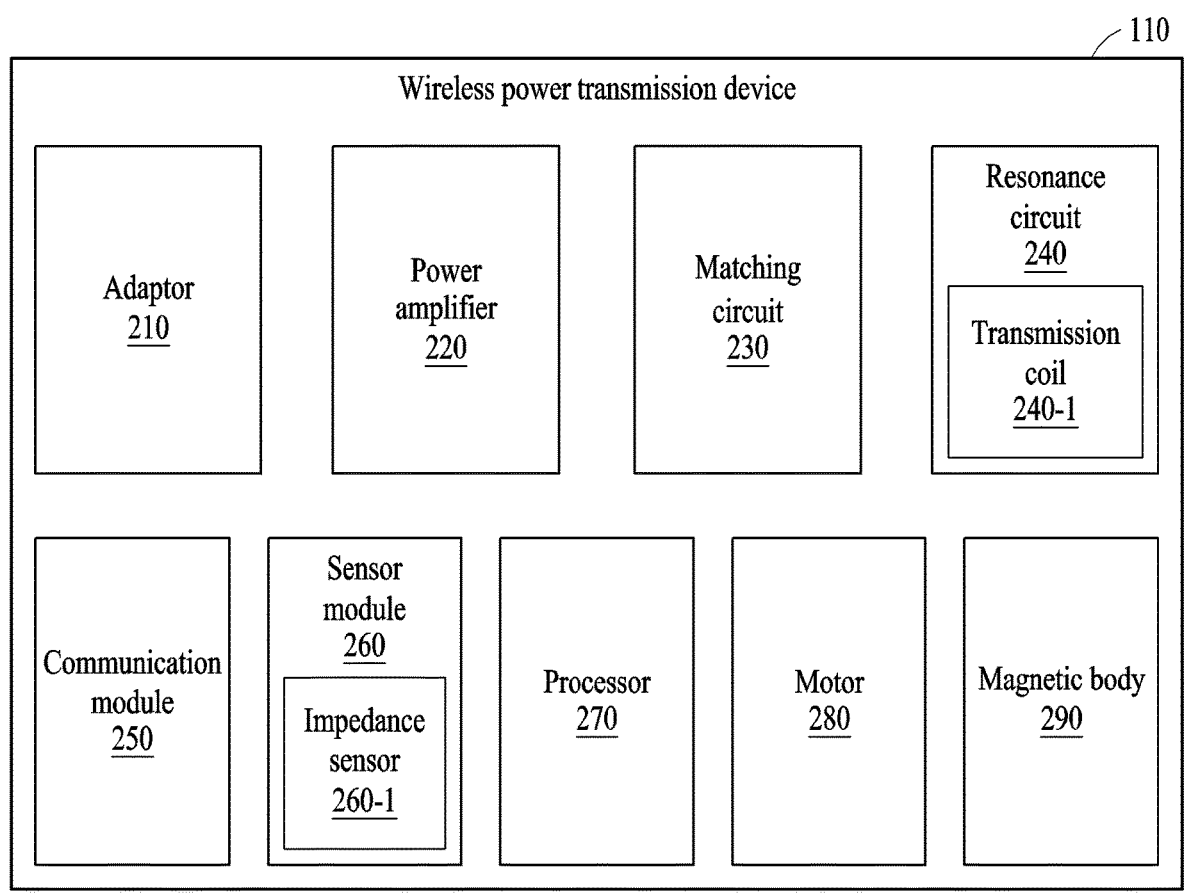
FIG. 2 is a block diagram illustrating a wireless power transmission device according to an embodiment of the disclosure.

FIG. 2 is a block diagram illustrating a wireless power transmission device according to an embodiment of the disclosure.

According to various embodiments, the wireless power transmission device 110 of FIG. 2 may include an adaptor 210, a power amplifier 220, a matching circuit 230, a resonance circuit 240, a communication module 250, a sensor module 260, a processor 270, a motor 280, and a magnetic body 290.

Referring to FIG. 2, the wireless power transmission device 110 may include the adaptor 210, but this is only an example, and the adaptor 210 may be implemented as a separate device from the wireless power transmission device 110.

The processor 270 may be implemented as a central processing unit (CPU), a micro controller unit (MCU), a field programmable gate array (FPGA), or the like but is not limited thereto.

According to various embodiments of the disclosure, the processor 270 may communicatively be coupled to a memory included in the wireless power transmission device 110.

According to various embodiments, the resonance circuit 240 may include a transmission coil 240-1. Although not shown in FIG. 2, the resonance circuit 240 may include one or more capacitors. A capacitor in the resonance circuit 240 may be connected to the transmission coil 240-1 in series and/or parallel.

According to various embodiments, the sensor module 260 may include an impedance sensor 260-1. The impedance sensor 260-1 may detect impedance based on a voltage and a current measured at a first point (e.g., an output end of the power amplifier 220, an input end of the matching circuit 230, an input end of the resonance circuit 240, etc.) of the wireless power transmission device 110. The impedance sensor 260-1 may transmit the detected impedance to the processor 270 as a voltage value. In an embodiment, when the wireless power reception device 120 is positioned in a charging region of the wireless power transmission device 110, the impedance (e.g., the impedance detected based on the current and voltage measured at the first point) in the wireless power transmission device 110 may change, and the impedance sensor 260-1 may detect the changed impedance and transmit the detected impedance to the processor 270 as a voltage value. In another embodiment, the impedance sensor 260-1 may measure the impedance of the resonance circuit 240 before the wireless power reception device 120 is positioned in a wireless charging region of the wireless power transmission device 110. The impedance of the resonance circuit 240 may change when the wireless power reception device 120 is positioned in the wireless charging region of the wireless power transmission device 110. The impedance sensor 260-1 may measure the impedance of the resonance circuit 240 after the wireless power reception device 120 is positioned in the wireless charging region of the wireless power transmission device 110. The impedance sensor 260-1 may generate a voltage value corresponding to a variation in the impedance of the resonance circuit 240 and output the generated voltage value to the processor 270.

According to various embodiments, the adaptor 210 may convert an alternating current (AC) (or AC power) into a direct current (DC) (or DC power). In an embodiment, the adaptor 210 may be, for example, a power delivery (PD) adaptor.

According to various embodiments, the power amplifier 220 may receive DC power from the adaptor 210, amplify the received DC power, and convert the amplified DC power into AC power. In an embodiment, the operating frequency of the power amplifier 220 may be the same as the resonant frequency of the resonance circuit 240. The frequency of AC power output from the power amplifier 220 may have a resonant frequency (e.g., 6.78 MHz). In another embodiment, the operating frequency of the power amplifier 220 may be different from the resonant frequency.

According to various embodiments, the AC power output from the power amplifier 220 may be transmitted to the resonance circuit 240 through the matching circuit 230.

According to various embodiments, the matching circuit 230 may include, for example, a T-type circuit, a pi ($\pi$)-type circuit, or a LCC circuit but is not limited thereto. The LCC circuit may include one or more inductors and two or more capacitors.

According to various embodiments, the resonance circuit 240 may generate an electromagnetic field through the received AC power. When an AC current flows through the transmission coil 240-1 in the resonance circuit 240, the transmission coil 240-1 may generate an electromagnetic field. An induced electromotive force may be generated by the electromagnetic field in the resonance circuit in the wireless power reception device 120. Accordingly, the resonance circuit 240 may transmit wireless power to the wireless power reception device 120.

According to various embodiments, the wireless power transmission device 110 may perform out-band communication with the wireless power reception device 120 through the communication module 250. Out-band communication may refer to communication using a frequency that is different from a resonant frequency. In an embodiment, the communication module 250 may include, for example, a BLE communication module (or a communication circuit). The communication module 250 may receive the advertisement signal described with reference to FIG. 1 from the wireless power reception device 120. In another embodiment, the resonance circuit 240 and the communication module 250 may be implemented as a single piece of hardware, so the wireless power transmission device 110 may also perform in-band communication with the wireless power reception device 120.

According to various embodiments, the communication module 250 may receive power information from the wireless power reception device 120. The power information may include, for example, at least one of remaining battery power, charging frequency, usage amount, battery capacity, battery percentage, and information about position movement (e.g., a moving distance or a change in a positional relationship) of the wireless power reception device 120.

According to various embodiments, the processor 270 may receive a voltage value from the impedance sensor 260-1 and calculate a difference value between a reference voltage value and the received voltage value. The processor 270 may determine control information (e.g., a rotation direction and the number of rotations of the motor 280) of the motor 280 based on the calculated difference value. In an embodiment, the processor 270 may determine the rotation direction of the motor 280 by determining whether the calculated difference value is a negative number or a positive number and determine the number of rotations of the motor 280 using the magnitude of the calculated difference value.

According to various embodiments, the processor 270 may measure or calculate the efficiency of the power amplifier 220. The efficiency of the power amplifier 220 may correspond, for example, to the ratio between the input power and output power of the power amplifier 220. When the wireless power reception device 120 is positioned in the charging region of the wireless power transmission device 110, the impedance (e.g., the impedance detected based on the current and voltage measured at the first point, the impedance of the resonance circuit 240, etc.) in the wireless power transmission device 110 may change, and due to this change, the efficiency of the power amplifier 220 may change (or decrease). After the wireless power reception device 120 is positioned in the charging region of the wireless power transmission device 110, the processor 270 may measure the efficiency of the power amplifier 220. The processor 270 may calculate the difference value between reference efficiency and the measured efficiency and determine control information of the motor 280 based on the calculated difference value.

According to various embodiments, the processor 270 may control or adjust the distance between the magnetic body 290 and the transmission coil 240-1 in the resonance circuit 240 by driving the motor 280 through the control information of the motor 280. As the motor 280 rotates, the magnetic body 290 may move, and the changed inductance of the transmission coil 240-1 may be adjusted (or compensated for or increased) by the movement of the magnetic body 290. Accordingly, impedance matching may occur in the resonance circuit 240.

FIGS. 3, 4, 5, 6, 7A, and 7B are diagrams illustrating an example of a wireless power transmission device, according to various embodiments of the disclosure.

Figure 3:
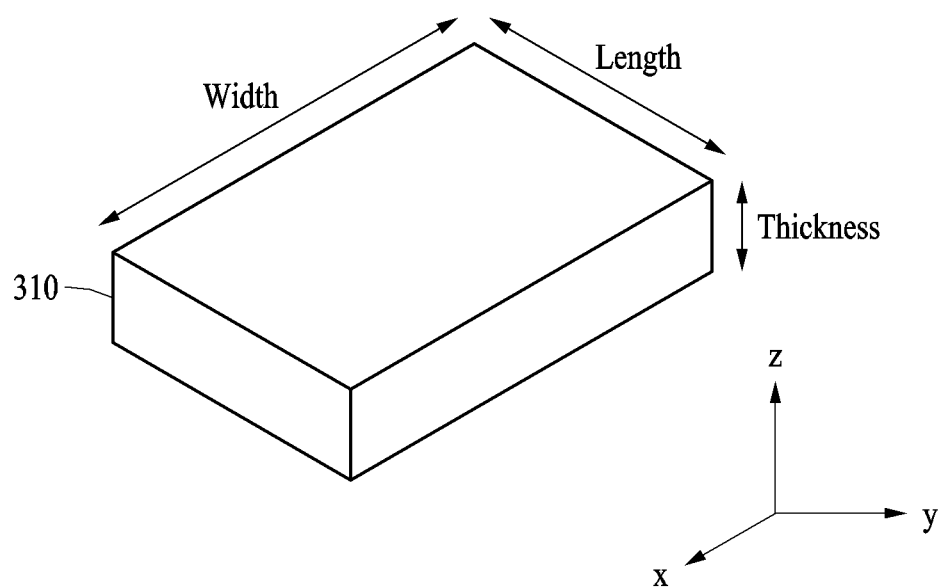
FIGS. 3, 4, 5, 6, 7A, and 7B are diagrams illustrating an example of a wireless power transmission device, according to various embodiments of the disclosure.
Figure 4:
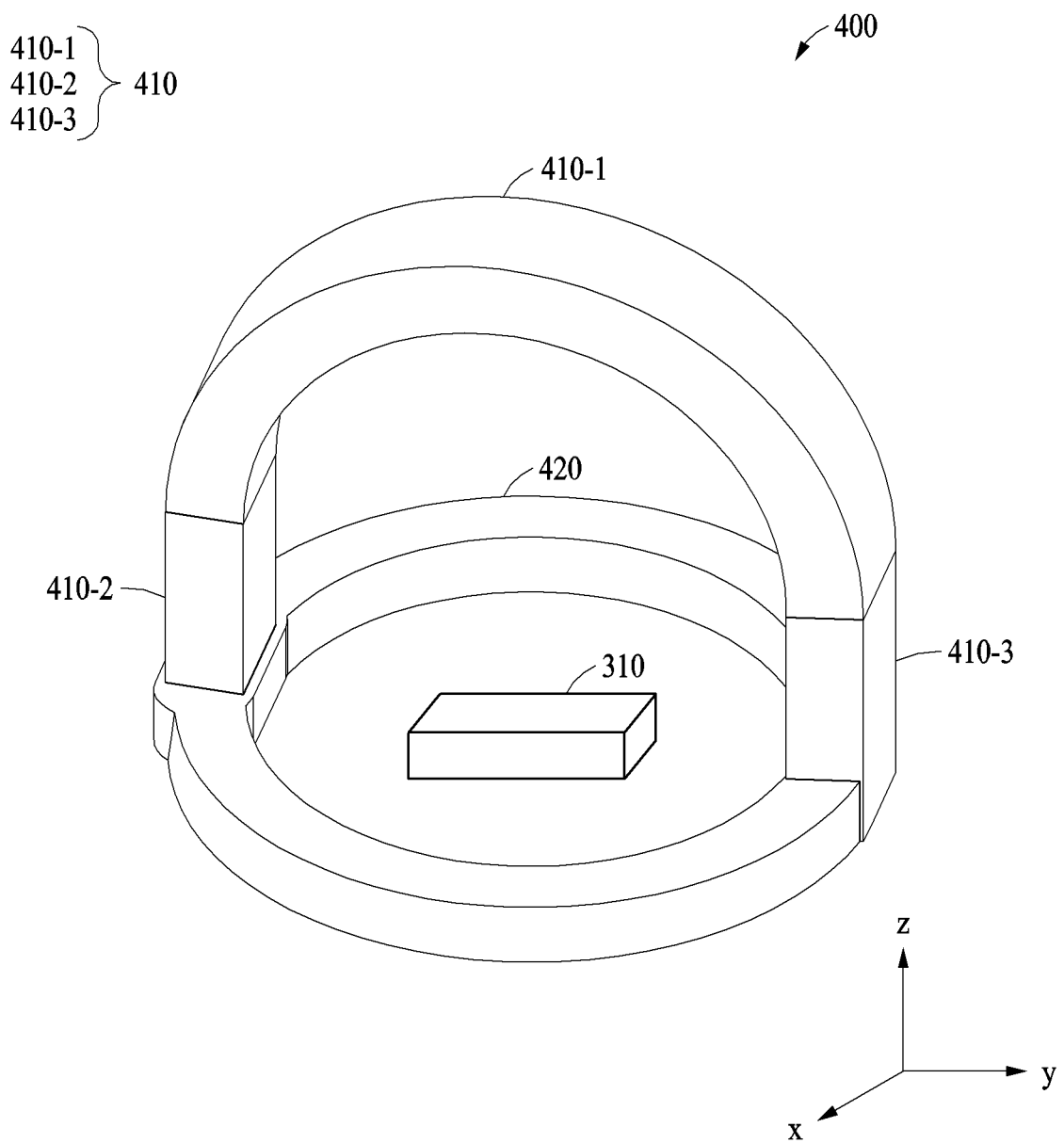

FIG. 3 illustrates an example of the magnetic body 290 of FIG. 2 and FIG. 4 illustrates an example of the transmission coil 240-1. A transmission coil 400 of FIG. 4 may be positioned in a housing that has the same shape as the transmission coil 400 of FIG. 4.

According to various embodiments, a magnetic body 310 of FIG. 3 may have a cuboid shape. In an embodiment, the magnetic body 310 may have an appropriate (or optimal) width, length, and thickness based on a simulation result that is described with reference to FIGS. 8A and 8B.

According to various embodiments, the transmission coil 400 of FIG. 4 may include a first member 410 and a second member 420. The first member 410 may include a bent curved portion 410-1, a first pillar portion 410-2, and a second pillar portion 410-3. The first member 410 may have a U shape. One side and the other side of the first member 410 may each form a first angle with a first plane (e.g., xy plane). The first angle may be, for example, 90 degrees but is not limited thereto. For example, the first pillar portion 410-2 and the second pillar portion 410-3 may each form the first angle with the first plane. The second member 420 may be disposed on the first plane. The second member 420 may be connected to each of the first pillar portion 410-2 and the second pillar portion 410-3. The second member 420 may have a loop shape. In the example shown in FIG. 2, the second member 420 may have a circular shape but is not limited thereto and may have a polygonal shape (e.g., a quadrangular shape).

Figure 5:
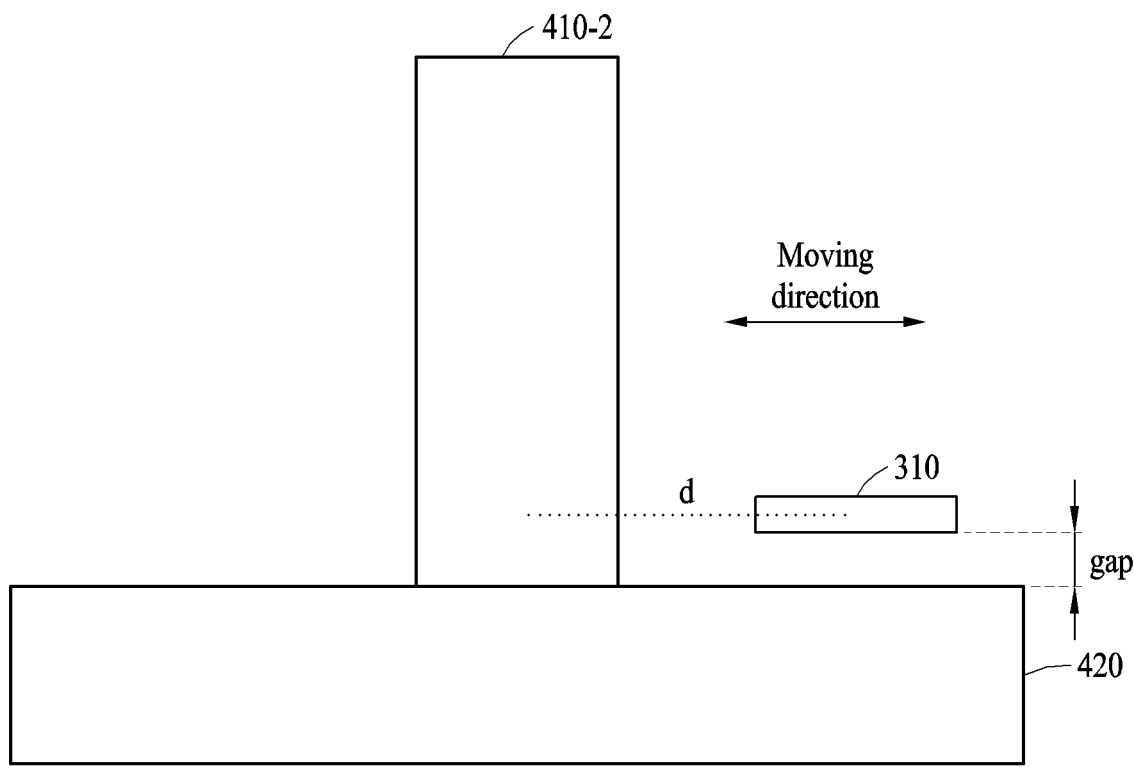
Figure 6:
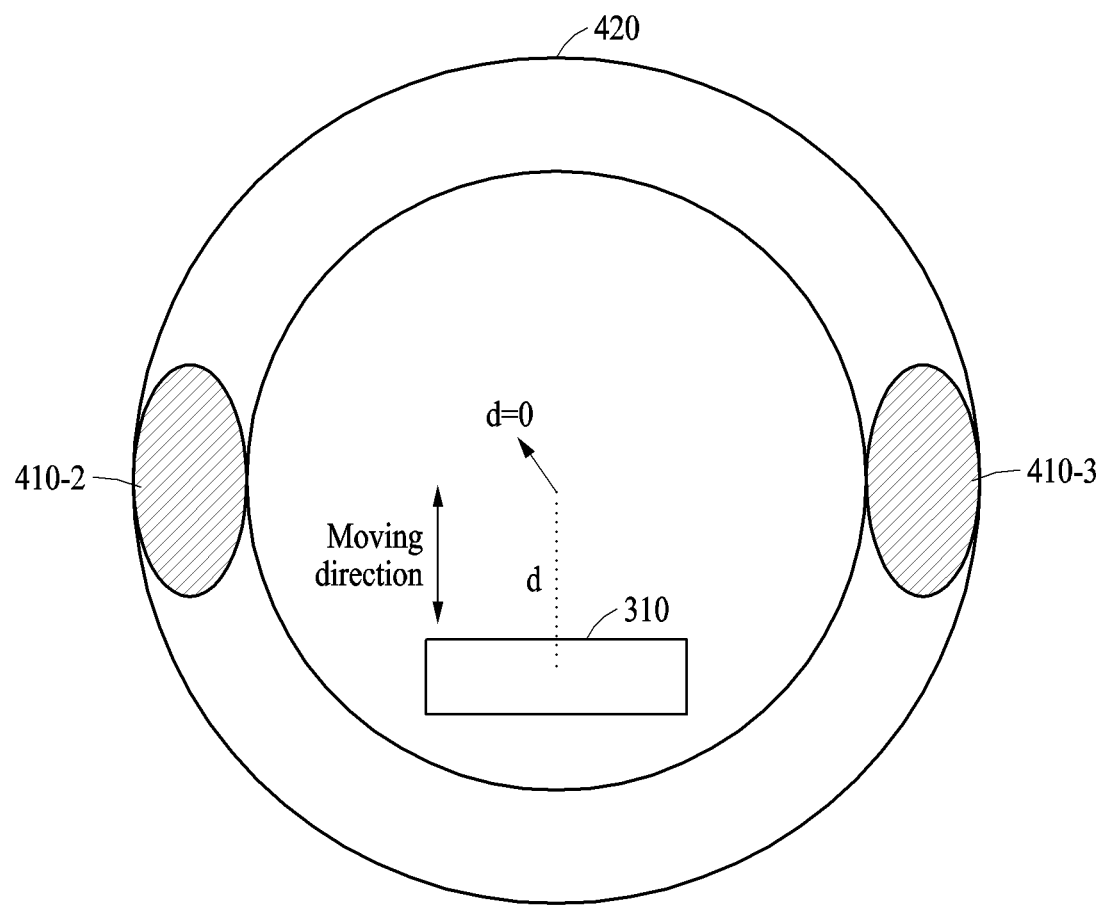
Figure 6:
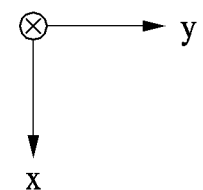

FIG. 5 illustrates a side view of the transmission coil 400 and the magnetic body 310 illustrated in FIG. 4 viewed in the −y-axis direction and FIG. 6 illustrates a plan view of the transmission coil 400 and the magnetic body 310 viewed in the z-axis direction. For convenience of description, the curved portion 410-1 is not illustrated in FIG. 6.

According to various embodiments, when referring to the example illustrated in FIG. 5, there may be a gap between the magnetic body 310 and the second member 420. The gap may be, for example, 1 millimeter (mm) but is not limited thereto.

According to various embodiments, in the examples illustrated in FIGS. 4 to 6, the center point of the magnetic body 310 may be positioned on the x-axis. The magnetic body 310 may be moved in the x-axis direction by the motor 280 to be described below.

According to various embodiments, when the wireless power reception device 120 is positioned in the wireless charging space of the wireless power transmission device 110, the impedance of the transmission coil 400 may change. The processor 270 may calculate a difference value ($\Delta V1$) between a reference voltage value and a voltage value corresponding to a variation in the impedance of the transmission coil 400. When the difference value ($\Delta V1$) is a positive number, the processor 270 may move the magnetic body 310 in the +x-axis direction by driving the motor 280. Accordingly, the magnetic body 310 may approach the second member 420 of the transmission coil 400. In other words, when the difference value ($\Delta V1$) is a positive number, the processor 270 may cause a distance d illustrated in FIGS. 5 and 6 to increase. As the magnitude of the difference value ($\Delta V1$) increases in the positive direction, the distance d may further increase. When the difference value ($\Delta V1$) is a negative number, the processor 270 may move the magnetic body 310 in the −x-axis direction by driving the motor 280. Accordingly, the magnetic body 310 may move away from the second member 420 of the transmission coil 400. In other words, when the difference value ($\Delta V1$) is a negative number, the processor 270 may cause the distance d to decrease. As the magnitude of the difference value ($\Delta V1$) increases in the negative direction, the distance d may further decrease.

In the example illustrated in FIG. 6, the shape of a cross-section of the first pillar portion 410-2 and the shape of a cross-section of the second pillar portion 410-3 are illustrated as ellipses, but this is only an example and the shape of the cross-section of the first pillar portion 410-2 and the shape of the cross-section of the second pillar portion 410-3 are not limited to the illustration of FIG. 6.

Figure 7A:
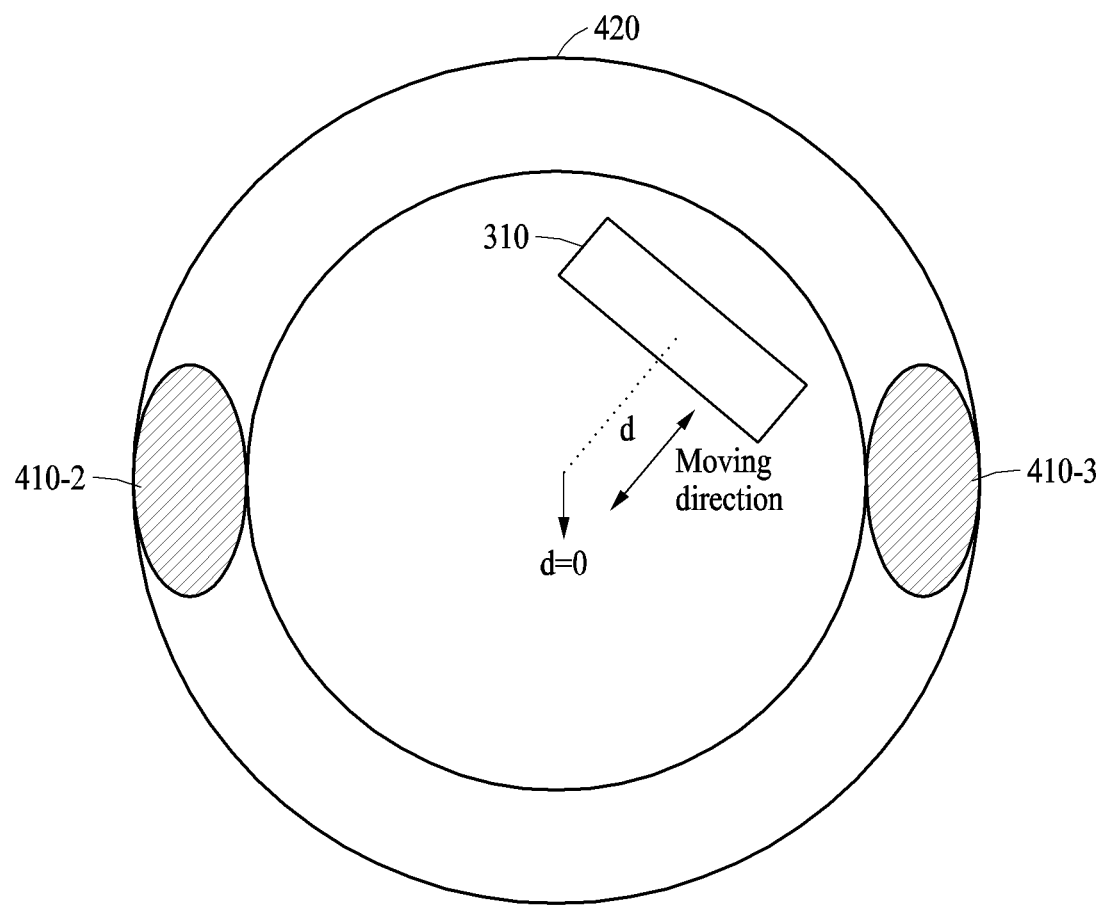

According to various embodiments, in the example illustrated in FIG. 7A, the center point of the magnetic body 310 may be positioned on a line forming a predetermined angle with the x-axis (or y-axis), and the processor 270 may move the magnetic body 310 in the direction of the corresponding line by driving the motor 280.

Figure 7B:
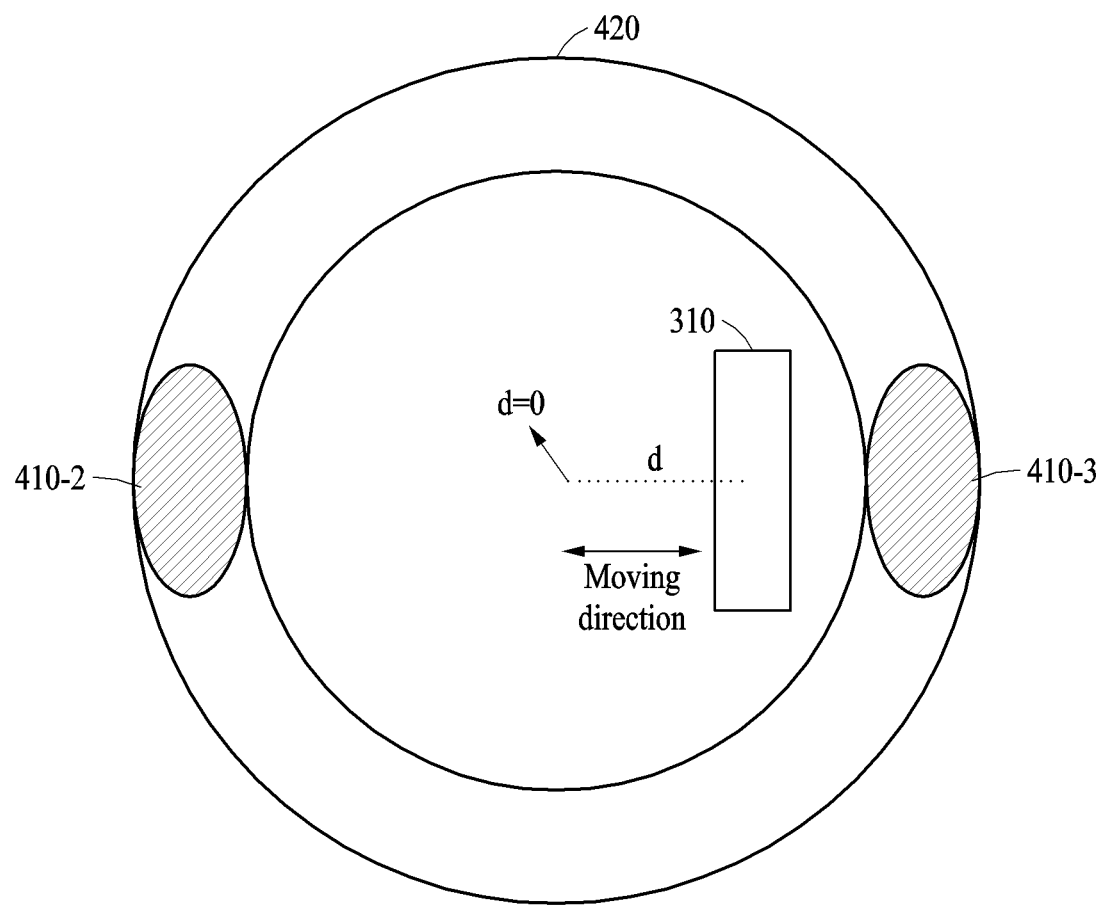
Figure 7B:
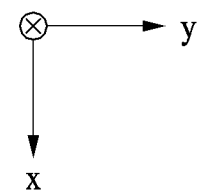

According to various embodiments, in the example illustrated in FIG. 7B, the center point of the magnetic body 310 may be positioned on the y-axis, and the processor 270 may move the magnetic body 310 in the y-axis direction by driving the motor 280.

Figure 8A:
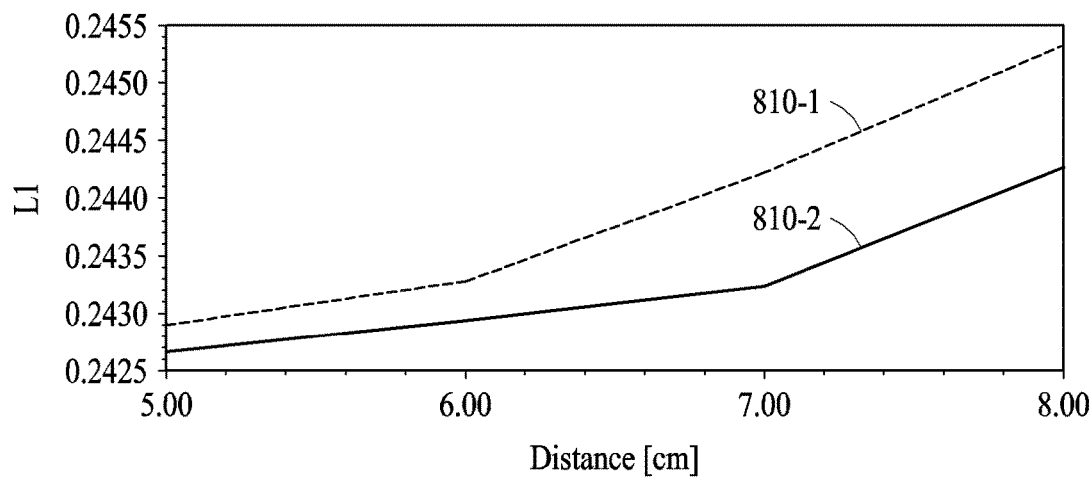
FIGS. 8A and 8B are diagrams illustrating a simulation result of a change in inductance of a transmission coil, according to various embodiments of the disclosure.
Figure 8B:
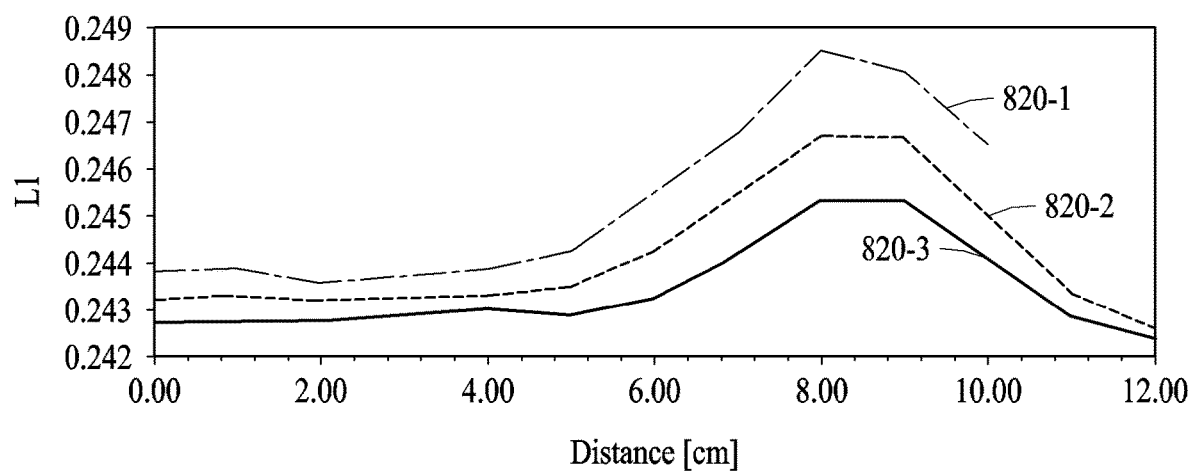

FIGS. 8A and 8B are diagrams illustrating a simulation result of a change in inductance of a transmission coil, according to various embodiments of the disclosure.

Referring to FIGS. 8A and 8B, the x-axis may correspond to the distance d described with reference to FIGS. 5 and 6 and the y-axis may correspond to inductance L1 of the transmission coil 240-1.

FIG. 8A illustrates a simulation result of a change in the inductance L1 of the transmission coil 240-1 according to the width of the magnetic body 310 and FIG. 8B illustrates a simulation result of a change in the inductance L1 of the transmission coil 240-1 according to the length of the magnetic body 310.

In the example illustrated in FIG. 8A, a graph 810-1 may represent the inductance L1 measured for each distance d when the width of the magnetic body 310 is 80 mm and the thickness of the magnetic body 310 is 3 mm, while a graph 810-2 may represent the inductance L1 measured for each distance d when the width of the magnetic body 310 is 50 mm and the thickness of the magnetic body 310 is 3 mm.

In the example illustrated in FIG. 8A, as the distance d increases the inductance L1 of the transmission coil 240-1 may increase. When the width of the magnetic body 310 is large at the same distance d, the inductance L1 of the transmission coil 240-1 may be large.

In the example illustrated in FIG. 8B, a graph 820-1 may represent the inductance L1 measured for each distance d when the length, width, thickness of the magnetic body 310 are 50 mm, 80 mm, and 3 mm, respectively. A graph 820-2 may represent the inductance L1 measured for each distance d when the length, width, and thickness of the magnetic body 310 are 40 mm, 80 mm, and 3 mm, respectively. A graph 820-3 may represent the inductance L1 measured for each distance d when the length, width, and thickness of the magnetic body 310 are 30 mm, 80 mm, and 3 mm, respectively.

In the example illustrated in FIG. 8B, when the distance d is less than 8 centimeters (cm), the inductance L1 of the transmission coil 240-1 may tend to increase as the distance d increases, while when the distance d is greater than or equal to 8 cm, the inductance L1 of the transmission coil 240-1 may tend to decrease as the distance d increases. When the length of the magnetic body 310 is long at the same distance d, the inductance L1 of the transmission coil 240-1 may be large. As the length of the magnetic body 310 increases, the magnetic resistance of magnetic flux within the width range of the magnetic body 310 may decrease, so the inductance L1 of the transmission coil 240-1 may increase.

According to various embodiments, the optimal width and length of the magnetic body 310 may be determined through a simulation result of a change in the inductance of the transmission coil 240-1 according to the width and length of the magnetic body 310. Although not described with reference to FIGS. 8A and 8B, the optimal thickness of the magnetic body 310 may be determined through a simulation result of a change in the inductance of the transmission coil 240-1 according to the thickness of the magnetic body 310.

Figure 9:
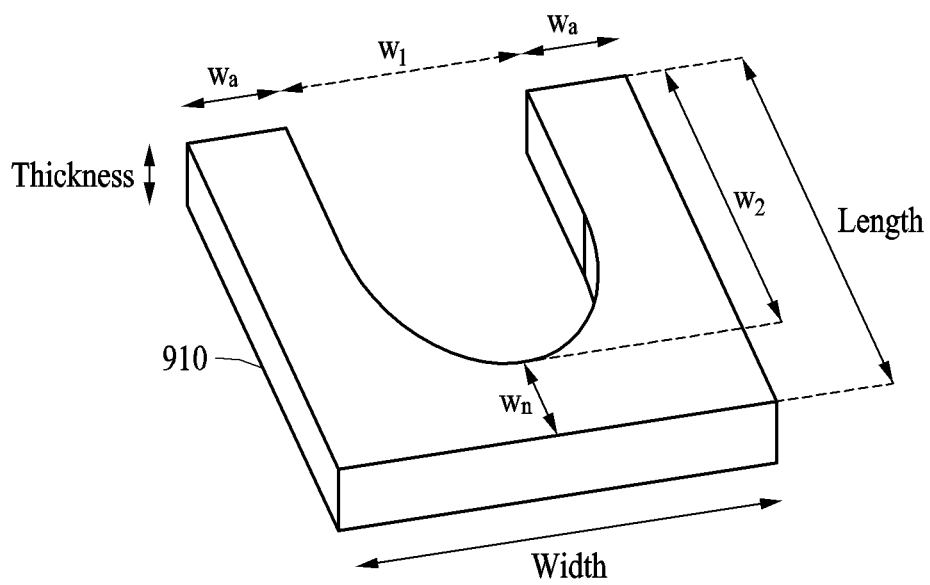
FIGS. 9, 10, and 11 are diagrams illustrating another example of a wireless power transmission device, according to various embodiments of the disclosure.
Figure 9:
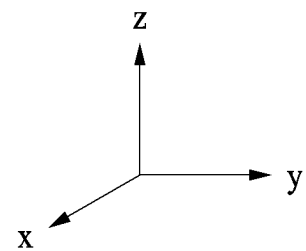
Figure 10:
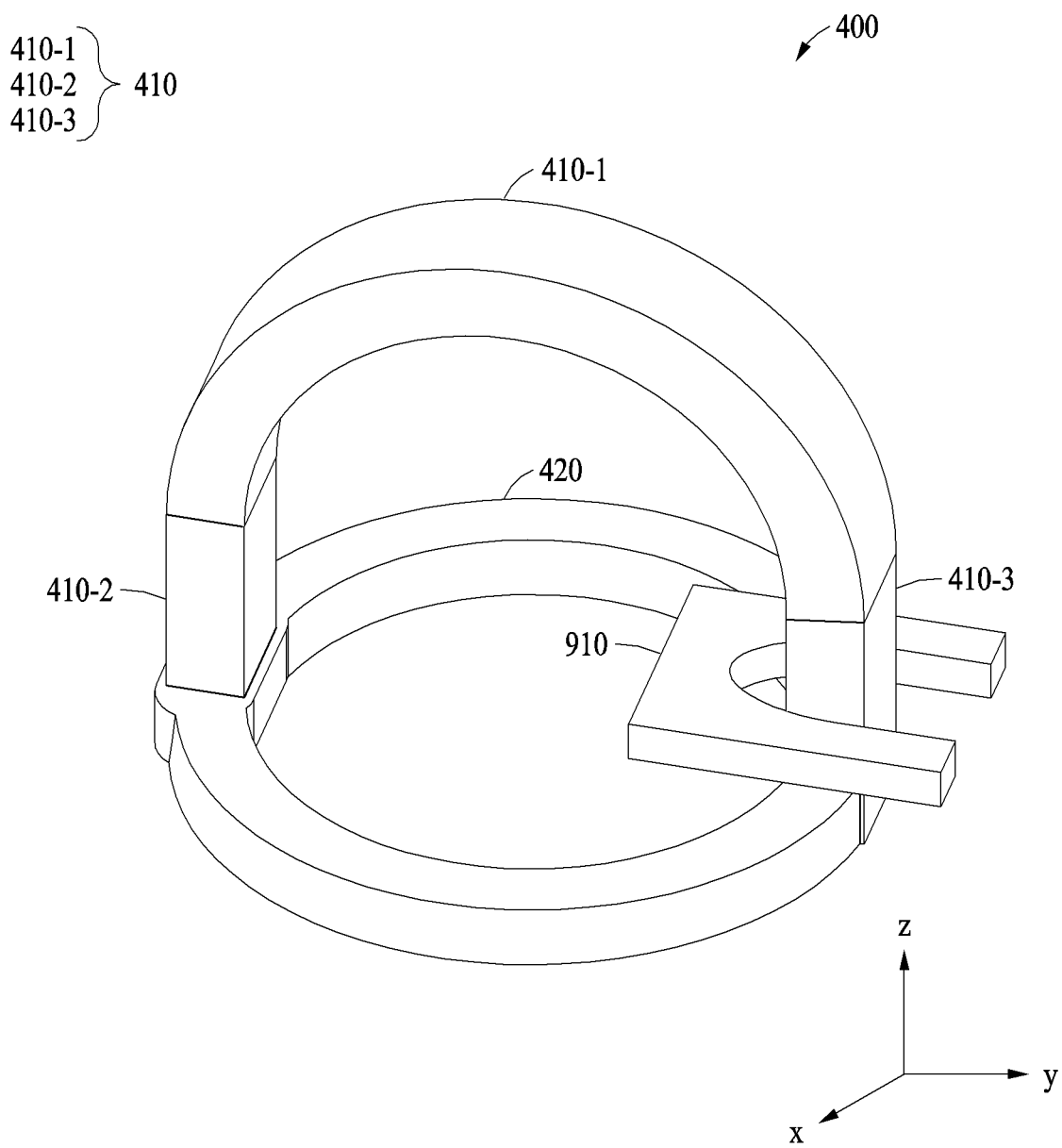
Figure 11:
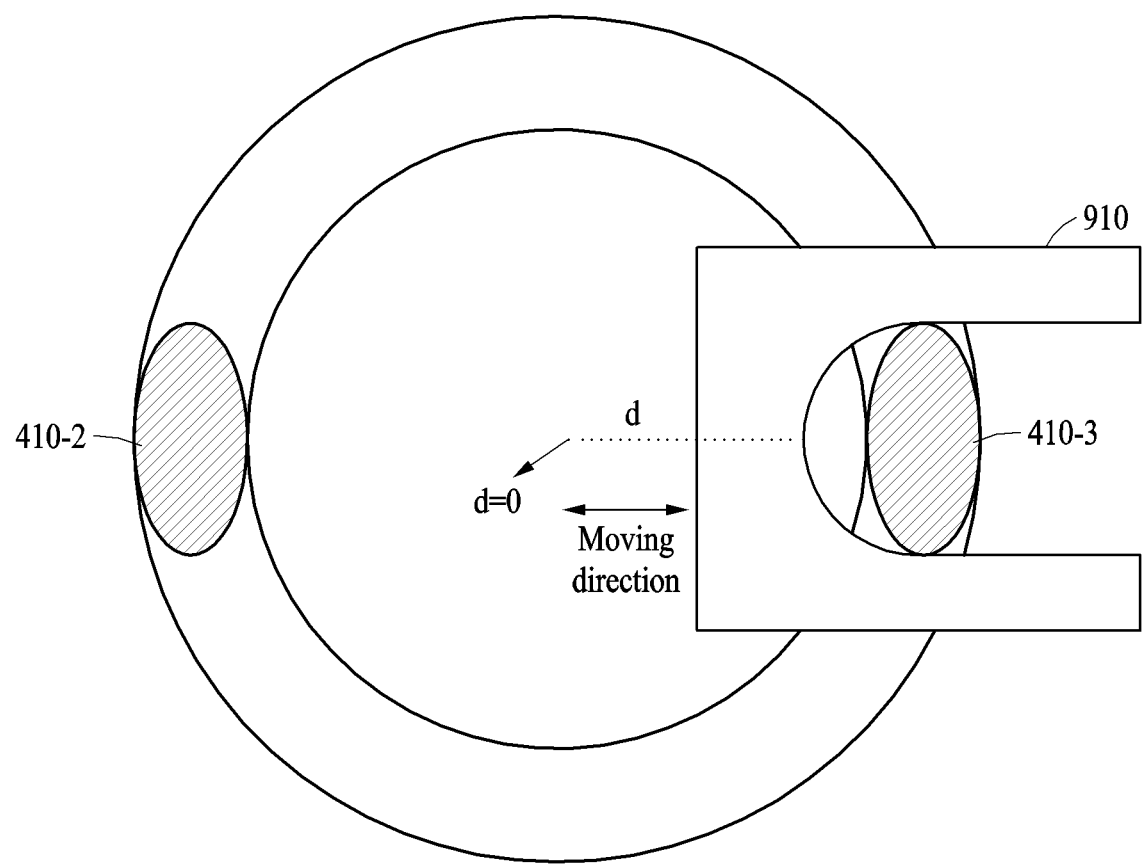

FIGS. 9, 10, and 11 are diagrams illustrating another example of a wireless power transmission device according to various embodiments of the disclosure.

FIG. 9 illustrates another example of the magnetic body 290 of FIG. 2, FIG. 10 illustrates a perspective view of a magnetic body 910 and the transmission coil 400, and FIG. 11 illustrates a plan view of the magnetic body 910 of FIG. 10 and the transmission coil 400 viewed in the z-axis direction. For convenience of description, the curved portion 410-1 is not illustrated in FIG. 11.

According to various embodiments, a groove may be formed into a side surface of the magnetic body 910 illustrated in FIG. 9. For example, as illustrated in FIG. 9, a "U"-shaped groove may be formed into the side surface of the magnetic body 910. In another example, a "⊏"-shaped groove may be formed into the side surface of the magnetic body 910.

According to various embodiments, in the example illustrated in FIG. 9, as described in detail with reference to FIG. 12C, wn may be twice wa. wn may represent the length of a neck portion of the magnetic body 910. wn may represent the difference between the total length of the magnetic body 910 and the maximum length w2 of a groove (e.g., a U-shaped groove). wa may represent the width of an arm portion of the magnetic body 910. wa may be obtained by dividing the difference between the total width of the magnetic body 910 and the maximum width w1 of the groove (e.g., the U-shaped groove) by 2.

According to various embodiments, the dented side surface of the magnetic body 910 may face a portion of the transmission coil 240-1 (e.g., the transmission coil 400). For example, as illustrated in FIG. 10, the dented side surface of the magnetic body 910 may face the second pillar portion 410-3 of the first member 410 of the transmission coil 400. The dented side surface of the magnetic body 910 may wrap a portion of the second pillar portion 410-3 of the transmission coil 400.

According to various embodiments, when the wireless power reception device 120 is positioned in the wireless charging space of the wireless power transmission device 110, the impedance of the transmission coil 400 may change. The processor 270 may calculate a difference value (ΔV2) between a reference voltage value and a voltage value corresponding to a variation in the impedance of the transmission coil 400. When the difference value (ΔV2) is a positive number, the processor 270 may drive the motor 280 such that the magnetic body 910 approaches the second pillar portion 410-3. In other words, when the difference value (ΔV2) is a positive number, the processor 270 may cause the distance d illustrated in FIG. 11 to increase. As the magnitude of the difference value (ΔV2) increases in the positive direction, the magnetic body 910 may approach the second pillar portion 410-3, so the distance d may further increase. When the difference value (ΔV2) is a negative number, the processor 270 may cause the magnetic body 910 to move away from the second pillar portion 410-3 by driving the motor 280. In other words, when the difference value (ΔV2) is a negative number, the processor 270 may cause the distance d to decrease. As the magnitude of the difference value (ΔV2) increases in the negative direction, the magnetic body 910 may move away from the second pillar portion 410-3, so the distance d may further decrease.

Figure 12A:
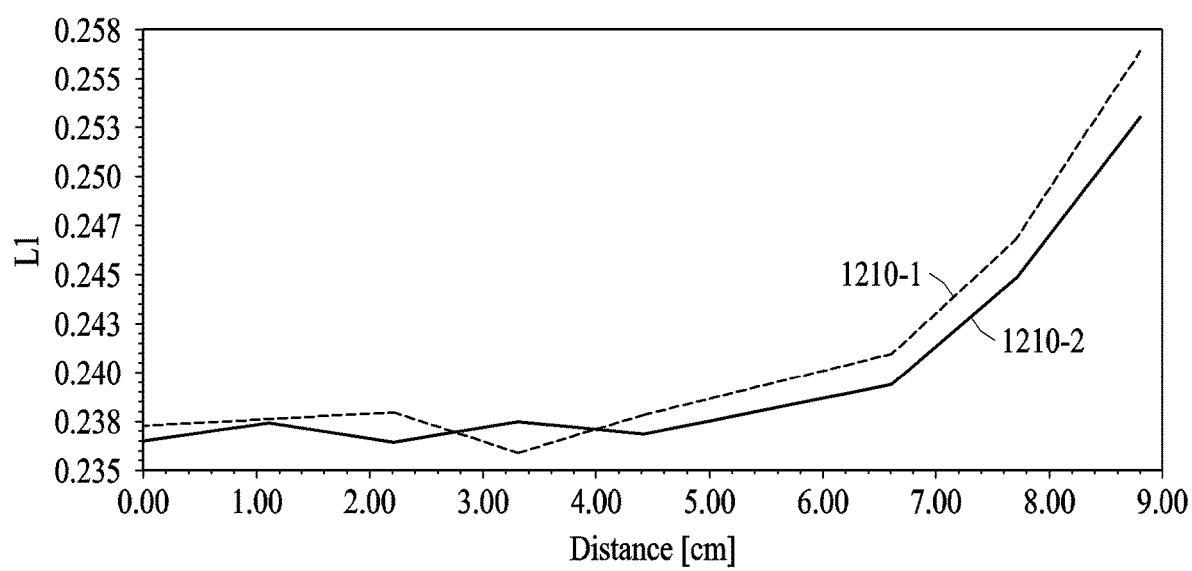
FIGS. 12A, 12B, and 12C are diagrams illustrating a simulation result of a change in inductance of a transmission coil, according to various embodiments of the disclosure.
Figure 12B:
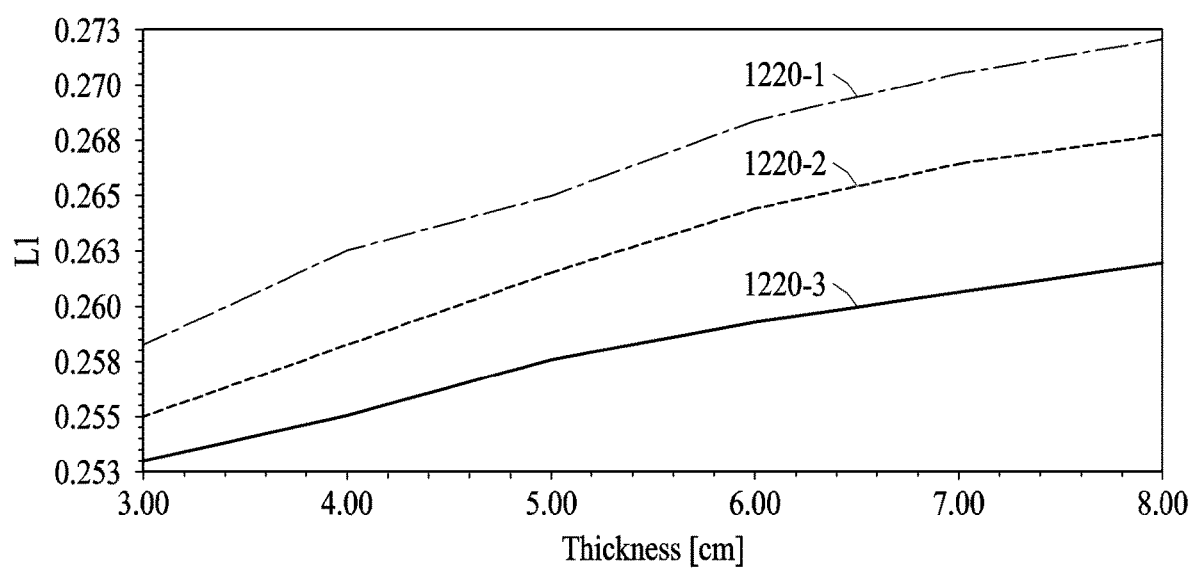
Figure 12C:
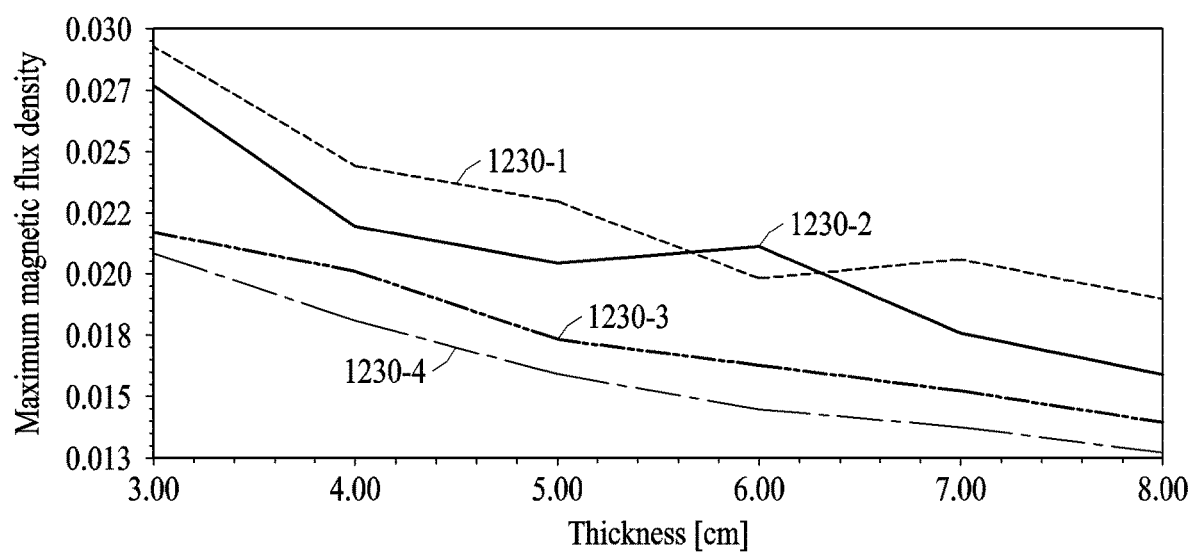

FIGS. 12A, 12B, and 12C are diagrams illustrating a simulation result of a change in inductance of a transmission coil, according to various embodiments of the disclosure.

FIG. 12A illustrates a simulation result of a change in the inductance L1 of the transmission coil 400 according to the width of the magnetic body 910.

Referring to FIG. 12A, the x-axis may correspond to the distance d described with reference to FIG. 11 and the y-axis may correspond to the inductance L1 of the transmission coil 400.

Referring to FIG. 12A, a graph 1210-1 may represent the inductance L1 measured for each distance d when the width of the magnetic body 910 is 60 mm, the thickness of the magnetic body 910 is 3 mm, and the length of the magnetic body 910 is 40 mm, while a graph 1210-2 may represent the inductance L1 measured for each distance d when the width of the magnetic body 310 is 50 mm, the thickness of the magnetic body 310 is 3 mm, and the length of the magnetic body 910 is 40 mm.

In the example illustrated in FIG. 12A, as the distance d increases, increases the inductance L1 of the transmission coil 400 may tend to increase. In other words, as the magnetic body 910 approaches the transmission coil 400, the inductance L1 may tend to increase. When the width of the magnetic body 910 is large at the same distance d, the inductance L1 of the transmission coil 400 may be large.

FIG. 12B illustrates a simulation result of a change in the inductance L1 of the transmission coil 400 according to the length of the magnetic body 910.

In the example illustrated in FIG. 12B, the x-axis may correspond to the thickness of the magnetic body 910 and the y-axis may correspond to the inductance L1 of the transmission coil 400.

In the example illustrated in FIG. 12B, a graph 1220-1 may represent the inductance L1 measured for each thickness of the magnetic body 910 when the length, width, and distance of the magnetic body 910 are 60 mm, 50 mm, and 8.8 cm, respectively. A graph 1220-2 may represent the inductance L1 measured for each thickness of the magnetic body 910 when the length, width, distance of the magnetic body 310 are 50 mm, 50 mm, and 8.8 cm, respectively. A graph 1220-3 may represent the inductance L1 measured for each thickness of the magnetic body 910 when the length, width, and distance of the magnetic body 310 are 40 mm, 50 mm, and 8.8 cm, respectively.

In the example illustrated in FIG. 12B, when the length and thickness of the magnetic body 910 increase, the inductance L1 of the transmission coil 400 may increase. That is, the magnetic resistance of the magnetic body 910 may decrease and the magnetic flux may increase, so the inductance L1 of the transmission coil 400 may increase.

FIG. 12C illustrates a simulation result of the maximum magnetic flux density of the magnetic body 910 according to wn.

In the example illustrated in FIG. 12C, the x-axis may correspond to the thickness of the magnetic body 910 and the y-axis may correspond to the maximum magnetic flux density of the magnetic body 910.

In the example illustrated in FIG. 12C, a graph 1230-1 may represent the maximum magnetic flux density of the magnetic body 910 measured for each thickness of the magnetic body 910 when wn and wa of the magnetic body 910 are both 5 mm. A graph 1230-2 may represent the maximum magnetic flux density of the magnetic body 910 measured for each thickness of the magnetic body 910 when wn and wa of the magnetic body 910 are 20 mm and 5 mm, respectively. A graph 1230-3 may represent the maximum magnetic flux density of the magnetic body 910 measured for each thickness of the magnetic body 910 when wn and wa of the magnetic body 910 are 15 mm and 5 mm, respectively. A graph 1230-4 may represent the maximum magnetic flux density of the magnetic body 910 measured for each thickness of the magnetic body 910 when wn and wa of the magnetic body 910 are 10 mm and 5 mm, respectively.

In the example illustrated in FIG. 12C, when wn and wa of the magnetic body 910 are 10 mm and 5 mm, respectively, the maximum magnetic flux density of the magnetic body 910 measured for each thickness of the magnetic body 910 may be the lowest. In other words, when wn is twice wa, the maximum magnetic flux density measured for each thickness of the magnetic body 910 may be the lowest.

According to various embodiments, through the simulation results described with reference to FIGS. 12A to 12C, the optimal width, length, and thickness of the magnetic body 310, wn, and wa may be determined. In this case, wn may be twice wa.

Figure 13:
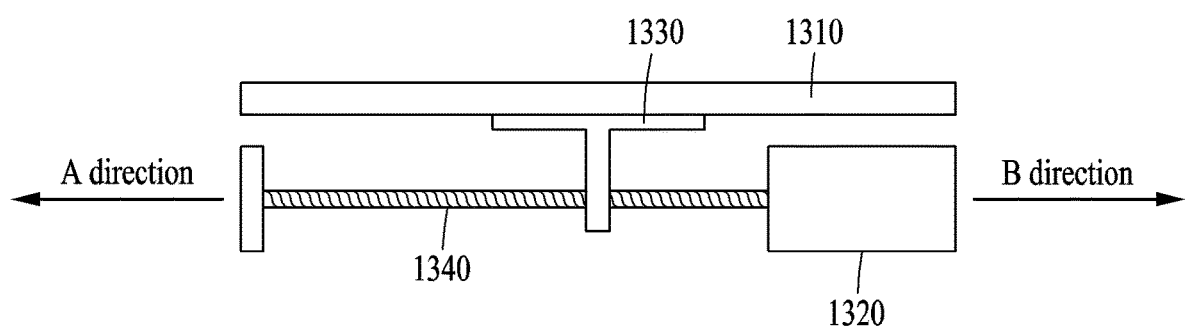
FIG. 13 is a diagram illustrating movement of a magnetic body by a motor, according to an embodiment of the disclosure.

FIG. 13 is a diagram illustrating movement of a magnetic body by a motor, according to an embodiment of the disclosure.

According to various embodiments, a magnetic body 1310 (e.g., the magnetic body 310 and the magnetic body 910) may be positioned on a moving nut 1330.

According to various embodiments, the processor 270 may calculate the difference value between a reference voltage value and a voltage value corresponding to a variation in the impedance of the resonance circuit 240 and determine control information (e.g., the rotation direction and the number of rotations of a motor 1320) of the motor 1320 (e.g., a stepper motor) based on the calculated difference value.

In an embodiment, the sign (e.g., + sign or − sign) of the calculated difference value may be related to the rotation direction of the motor 1320 (or the moving direction of the magnetic body 1310), and the magnitude of the calculated difference value may be related to the number of rotations of the motor 1320 (or the moving distance of the magnetic body 1310). For example, when the calculated difference value is diff_1 (here, diff_1>0), the processor 270 may determine the rotation direction of the motor 1320 such that the magnetic body 1310 moves in A direction (e.g., the direction toward the transmission coil 400) and determine the number of rotations of the motor 1320 based on the magnitude of diff_1. When the calculated difference is diff_2 (here, diff_2<0), the processor 270 may determine the rotation direction of the motor 1320 such that the magnetic body 1310 moves in B direction (e.g., the direction away from the transmission coil 400) and determine the number of rotations of the motor 1320 based on the magnitude of diff_2.

According to various embodiments, the processor 270 may drive (or rotate) the motor 1320 by controlling a driver circuit of the motor 1320 based on the control information of the motor 1320. As the motor 1320 rotates, a screw axis 1340 may rotate. The magnetic body 1310 positioned on the moving nut 1330 may be moved by the rotation of the screw axis 1340.

According to various embodiments, the processor 270 may move the magnetic body 1310 until the calculated difference value approaches a predetermined value (e.g., 0) or falls within a predetermined range (e.g., 0±α). When the calculated difference value approaches the predetermined value (e.g., 0) or falls within the predetermined range (e.g., 0±α), the processor 270 may not move the magnetic body 1310. A case in which the calculated difference value approaches the predetermined value (e.g., 0) or falls within the predetermined range (e.g., 0±α) may be a case in which a change in the impedance of the resonance circuit 240 is compensated for and impedance matching occurs. At a resonant frequency, the wireless power transmission device 110 may transmit wireless power to the wireless power reception device 120.

FIGS. 14A, 14B, 14C, and 14D are diagrams illustrating examples of a power amplifier of a wireless power transmission device, according to various embodiments of the disclosure.

Power amplifiers 1410 to 1440 of FIGS. 14A to 14D may each correspond to an example of the power amplifier 220 of FIG. 2.

Figure 14A:
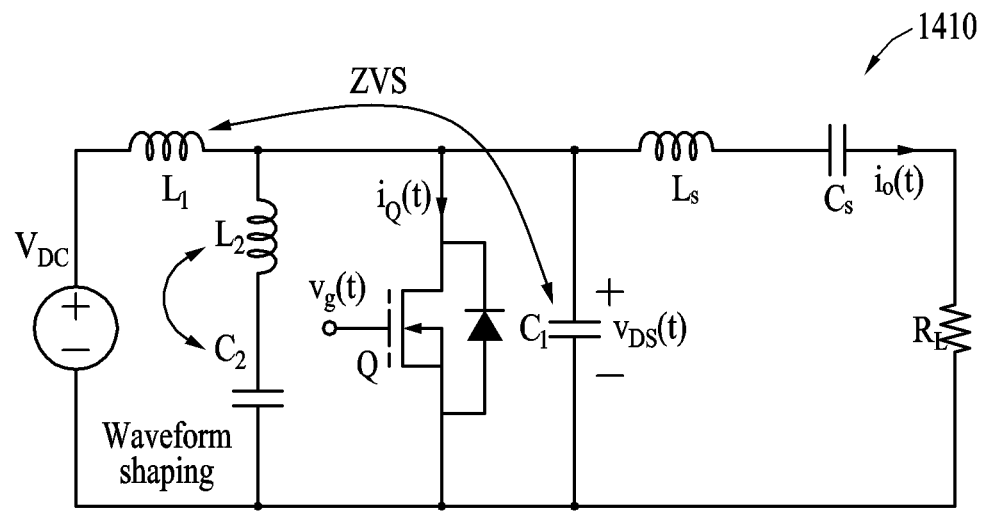
FIGS. 14A, 14B, 14C, and 14D are diagrams illustrating examples of a power amplifier of a wireless power transmission device, according to various embodiments of the disclosure.
Figure 14A:
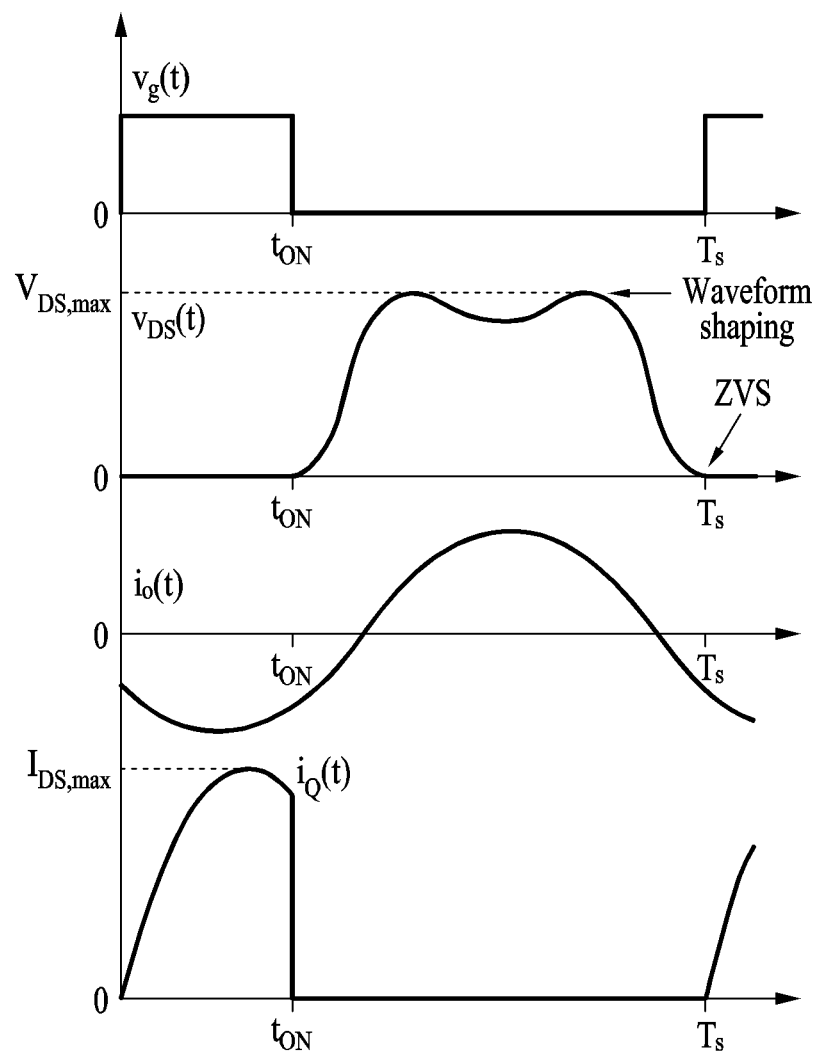

The power amplifier 1410 of FIG. 14A may be a class EF2 power amplifier.

Figure 14B:
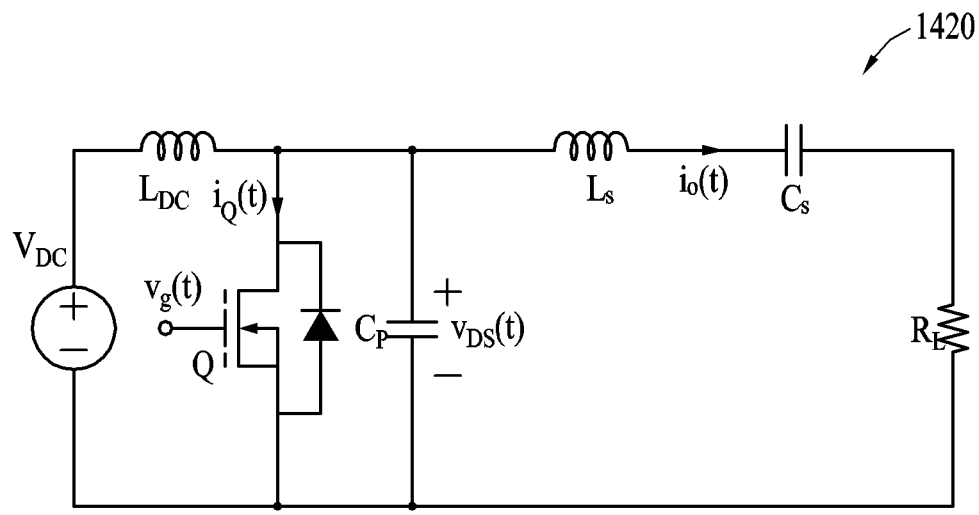
Figure 14B:
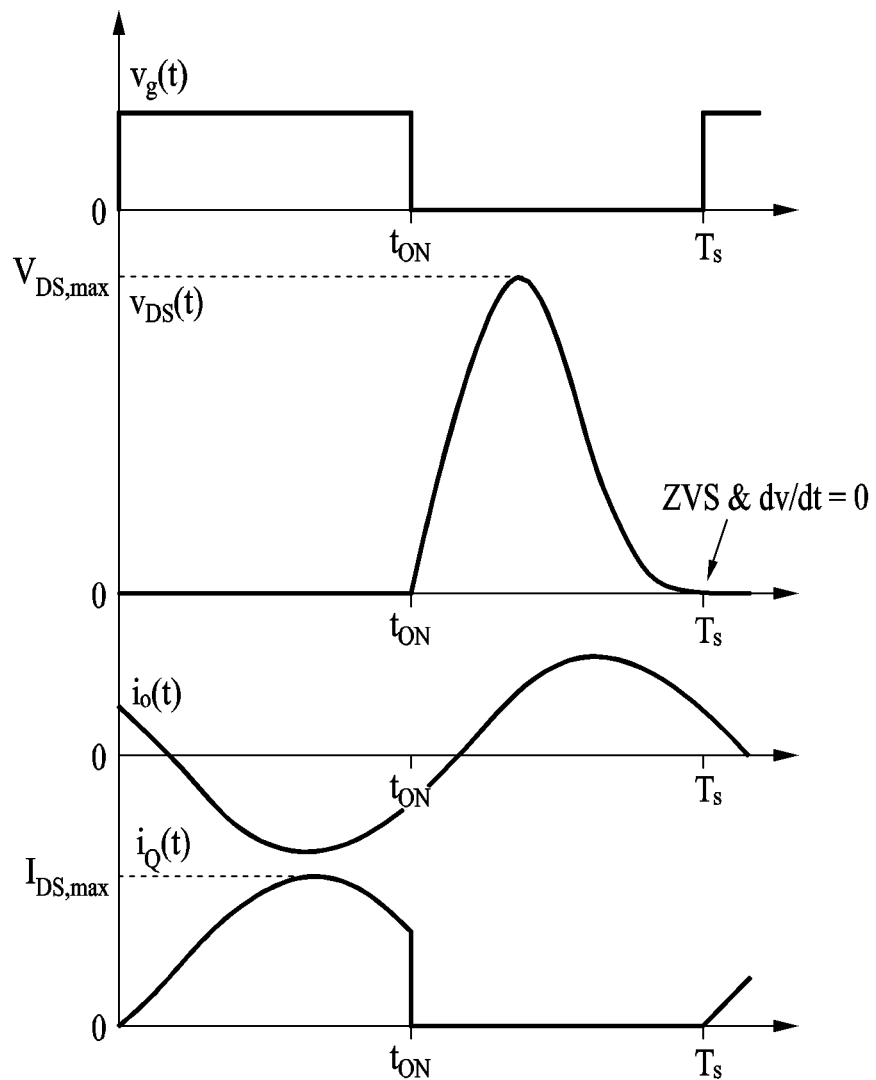

The power amplifier 1420 of FIG. 14B may be a class F power amplifier.

Figure 14C:
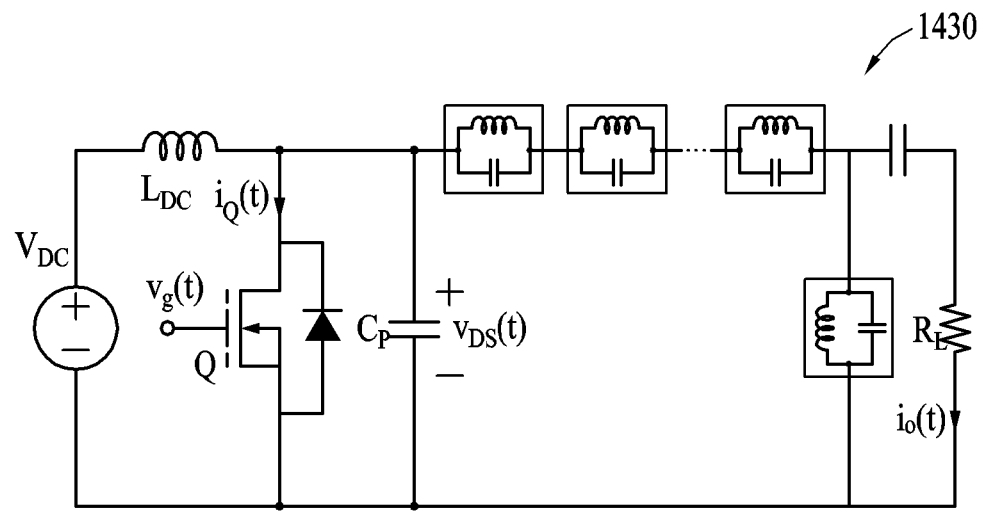
Figure 14C:
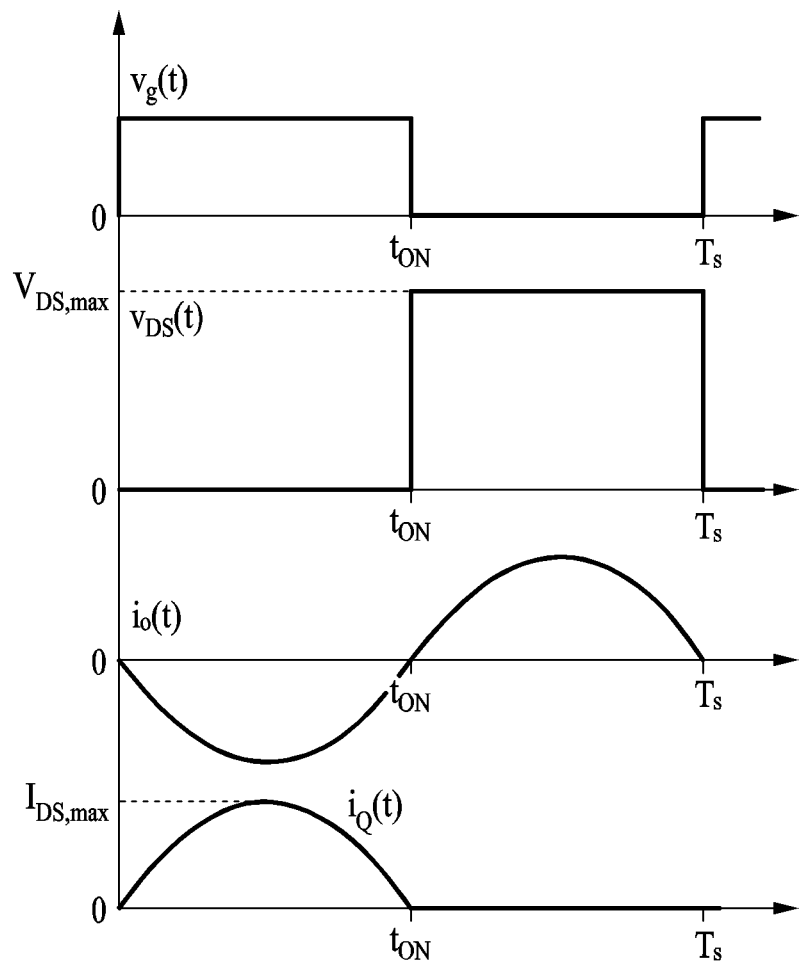

The power amplifier 1430 of FIG. 14C may be a class E power amplifier.

Figure 14D:
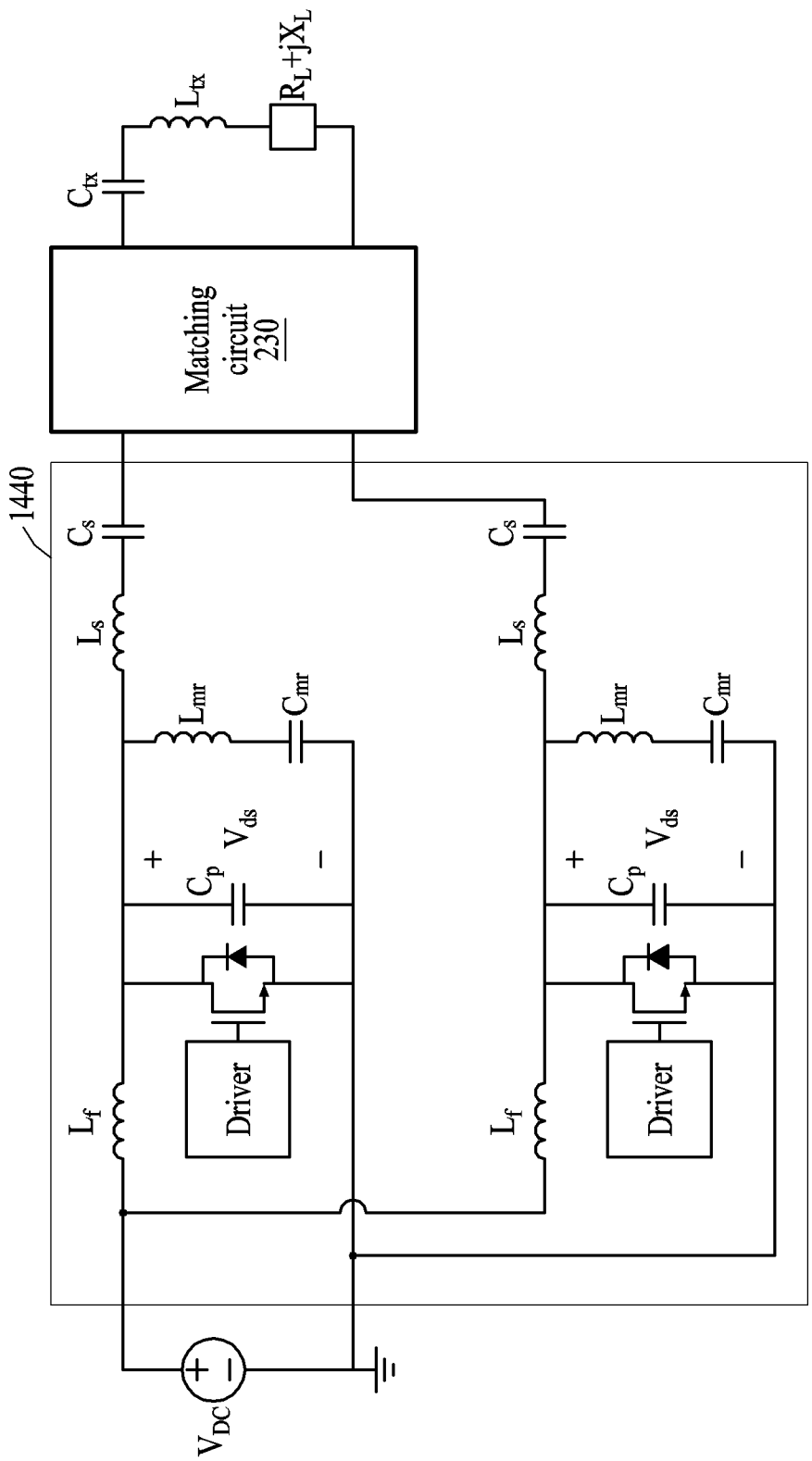

The power amplifier 1440 of FIG. 14D may be a differential class EF2 power amplifier.

According to various embodiments, the power amplifier 1410 of FIG. 14A may include a second-order filter of an inductor L2 and a capacitor C2. The second-order filter of L2 and C2 may perform waveform shaping. Vds,max of the power amplifier 1410 may be lower than Vds,max of the power amplifier 1420 of FIG. 14B and Vds,max of the power amplifier 1430 of FIG. 14C.

According to various embodiments, the power amplifier 220 (e.g., each of the power amplifiers 1410 to 1440) of FIG. 2 may generate an AC voltage including a resonant frequency (or an operating frequency) (e.g., 6.78 MHz) and a harmonic frequency through an input voltage VDC (e.g., a voltage supplied from the adaptor 210).

According to various embodiments, in the example illustrated in FIGS. 14A to 14D, the AC current at the resonant frequency may be supplied to a transmission coil Ltx through the matching circuit 230 and a first-order filter of an inductor LS and a capacitor Cs in the power amplifier 1440.

According to various embodiments, the magnitude of the AC current output from the power amplifier 1440 may be increased by the matching circuit 230, and the AC current with the increased magnitude may be supplied to the transmission coil Ltx. In other words, the magnitude of the AC current supplied to the transmission coil Ltx may be greater than the magnitude of the AC current output from the power amplifier 1440.

According to various embodiments, the matching circuit 230 may convert an AC voltage source (e.g., the power amplifier 1440) into an AC current source. In other words, the power amplifier 1440 may operate as an AC current source by the matching circuit 230. The matching circuit 230 is described in detail with reference to FIGS. 15A, 15B, 15C, 16A, 16B, and 16C.

FIGS. 15A, 15B, 15C, 16A, 16B, and 16C are diagrams illustrating examples of a matching circuit of a wireless power transmission device, according to various embodiments of the disclosure.

Figure 15A:
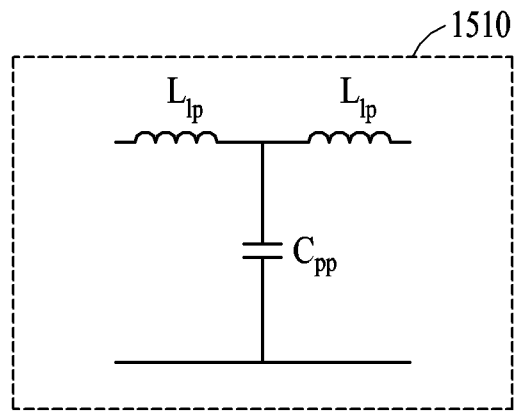
FIGS. 15A, 15B, 15C, 16A, 16B, and 16C are diagrams illustrating examples of a matching circuit of a wireless power transmission device, according to various embodiments of the disclosure.
Figure 15B:
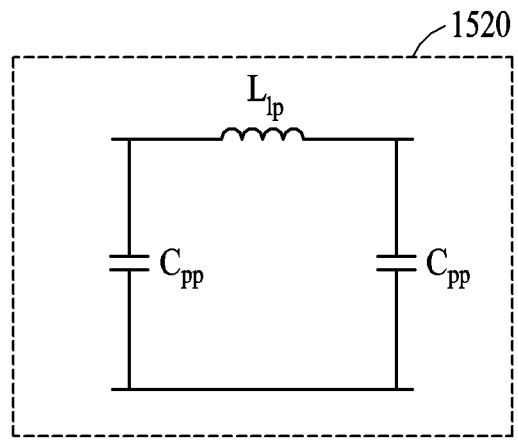
Figure 15C:
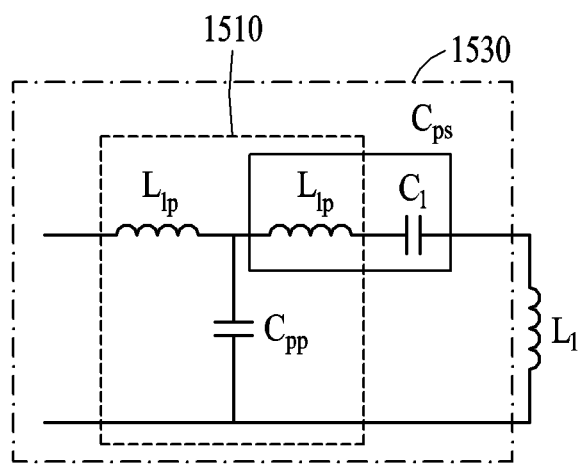

FIG. 15A illustrates a T-type circuit 1510 as an example of the matching circuit 230, FIG. 15B illustrates a π-type circuit 1520 as another example of the matching circuit 230, and FIG. 15C illustrates an LCC circuit 1530 as yet another example of the matching circuit 230. In the example illustrated in FIG. 15C, the LCC circuit 1530 may include the T-type circuit 1510 and the capacitor C1 of the resonance circuit 240.

Figure 16A:
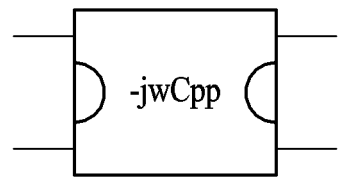

According to various embodiments, FIG. 16A illustrates a gyrator equivalent circuit of the T-type circuit 1510 and the π-type circuit 1520. The relationship between an inductor and a capacitor in the T-type circuit 1510 and the π-type circuit 1520 may be expressed by Equation 1 below.

$$j\omega L_{1p} + \frac{1}{j\omega C_{pp}} = 0 \qquad \text{Equation 1}$$

Figure 16B:
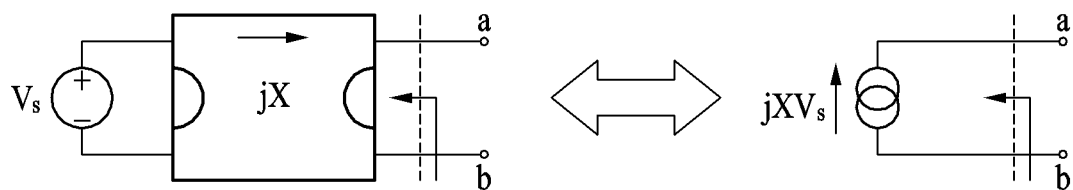

According to various embodiments, the matching circuit 230 may convert the AC voltage source characteristic of the power amplifier 220 into an AC current source. In FIG. 16B, when viewed from a terminal a and a terminal b, an AC voltage source $V_s$ may appear as an AC current source $jXV_s$ due to the matching circuit 230. In an embodiment, the magnitude of the AC current source $jXV_s$ may be determined by X (e.g., $C_{pp}$)

Figure 16C:
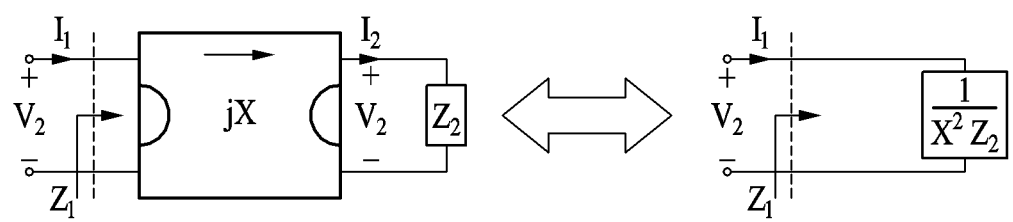

According to various embodiments, when the impedance of the resonance circuit 240 decreases, the power amplifier 220 may have a more inductive load. In FIG. 16C, the input impedance $Z_1$ of the matching circuit 230 may be inversely proportional to the impedance $Z_2$ of the resonance circuit 240. When the impedance $Z_2$ of the resonance circuit 240 decreases, the input impedance $Z_1$ may increase, so the power amplifier 220 may have a more inductive load.

FIGS. 17A, 17B, 17C, 17D, 17E, 18A, and 18B are diagrams illustrating detection of a change in impedance of a resonance circuit of a wireless power transmission device, according to various embodiments of the disclosure.

Figure 17A:
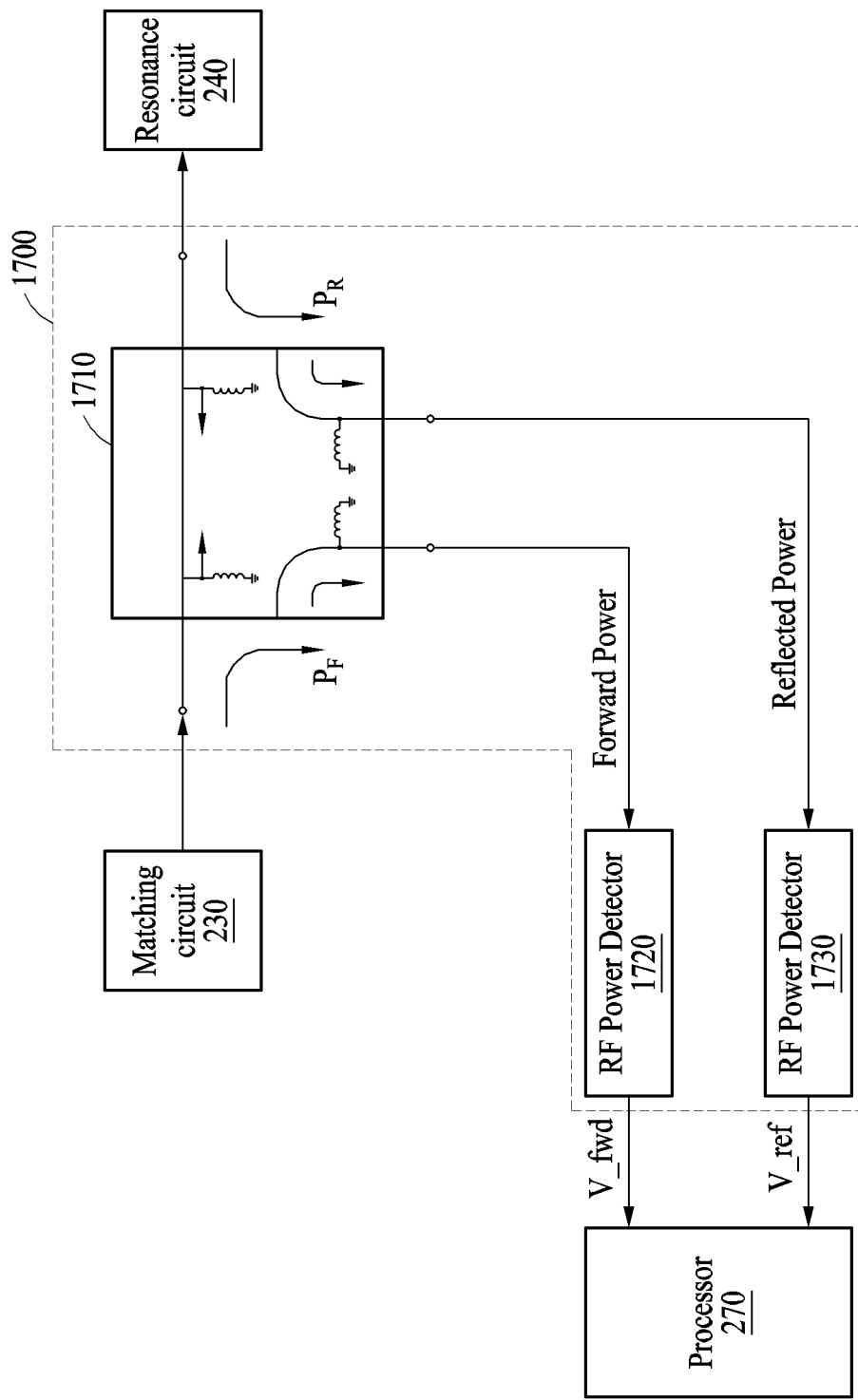
FIGS. 17A, 17B, 17C, 17D, 17E, 18A, and 18B are diagrams illustrating detection of a change in impedance of a resonance circuit of a wireless power transmission device, according to various embodiments of the disclosure.
Figure 17B:
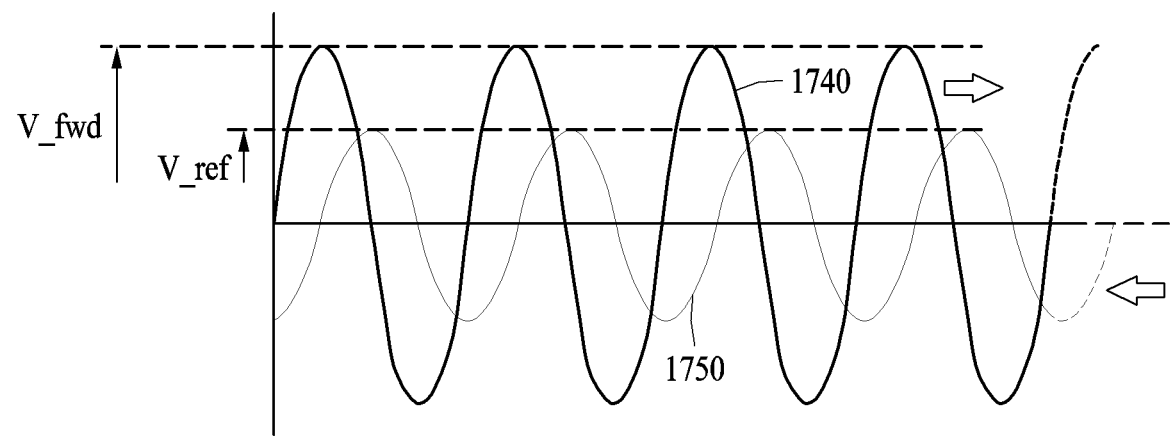

According to various embodiments, in the example illustrated in FIG. 17A, an impedance sensor 1700 may include a directional coupler 1710 and radio frequency (RF) power detectors 1720 and 1730.

According to various embodiments, the directional coupler 1710 may detect power (hereinafter, "forward power $P_F$") supplied to the resonance circuit 240 and transmit the detected forward power $P_F$ to the RF power detector 1720. The directional coupler 1710 may detect power (hereinafter, "reflected power $P_R$") obtained when the forward power $P_F$ is reflected by the resonance circuit 240 and transmit the detected reflected power $P_R$ to the RF power detector 1730.

According to various embodiments, the RF power detector 1720 may transmit a voltage value V_fwd of the forward power $P_F$ to the processor 270. The RF power detector 1730 may transmit a voltage value V_ref of the reflected power $P_R$ to the processor 270. In the example illustrated in FIG. 17B, the RF power detector 1720 may obtain the voltage value V_fwd from the voltage 1740 of the forward power $P_F$ and transmit the voltage value V_fwd to the processor 270. The RF power detector 1730 may obtain the voltage value V_ref from the voltage 1750 of the reflected power $P_R$ and transmit the voltage value V_ref to the processor 270. Although FIG. 17A illustrates two RF power detectors 1720 and 1730, this is only an example. An RF power detector may obtain the voltage value V_fwd from the voltage 1740 of the forward power $P_F$ and obtain the voltage value V_ref from the voltage 1750 of the reflected power $P_R$.

According to various embodiments, the processor 270 may calculate a voltage standing wave ratio (VSWR) using the voltage value V_fwd and the voltage value V_ref. For example, the processor 270 may calculate the VSWR through Equation 2 below.

$$VSWR = \frac{V\_fwd + V\_ref}{V\_fwd - V\_ref} \qquad \text{Equation 2}$$

According to various embodiments, the processor 270 may calculate the magnitude of the impedance of the resonance circuit 240 through the VSWR. The processor 270 may calculate a variation (e.g., the difference between the magnitude of the impedance of the resonance circuit 240 before the wireless power reception device 120 is positioned in a wireless charging space and the magnitude of the impedance of the resonance circuit 240 after the wireless power reception device 120 is positioned in the wireless charging space) in the magnitude of the impedance of the resonance circuit 240 by calculating the magnitude of the impedance of the resonance circuit 240. The processor 270 may calculate the difference value between a reference voltage value and a voltage value corresponding to a variation in the magnitude of impedance, determine control information of the motor 280 based on the calculated difference value, and move a magnetic body (e.g., the magnetic body 310 and the magnetic body 910) by driving the motor 280 through the determined control information.

According to various embodiments, when the VSWR is greater than a first value (e.g., 1), the processor 270 may move the magnetic body (e.g., the magnetic body 310 and the magnetic body 910) toward the transmission coil 400 and when the VSWR is less than the first value, the processor 270 may move the magnetic body (e.g., the magnetic body 310 and the magnetic body 910) away from the transmission coil 400. For example, the processor 270 may calculate the difference value between the VSWR and the first value. When the calculated difference value is a positive number, the processor 270 may determine the rotation direction of the motor 280 such that the magnetic body (e.g., the magnetic body 310 and the magnetic body 910) is closer to the transmission coil 400 and determine the number of rotations of the motor 280 through the magnitude of the calculated difference value. The processor 270 may drive the motor 280 based on the determined rotation direction and the number of rotations such that the magnetic body (e.g., the magnetic body 310 and the magnetic body 910) approaches the transmission coil 400. When the calculated difference value is a negative number, the processor 270 may determine the rotation direction of the motor 280 such that the magnetic body (e.g., the magnetic body 310 and the magnetic body 910) moves away from the transmission coil 400 and determine the number of rotations of the motor 280 through the magnitude of the calculated difference value. The processor 270 may drive the motor 280 based on the determined rotation direction and the number of rotations such that the magnetic body (e.g., the magnetic body 310 and the magnetic body 910) moves away from the transmission coil 400.

Figure 17C:
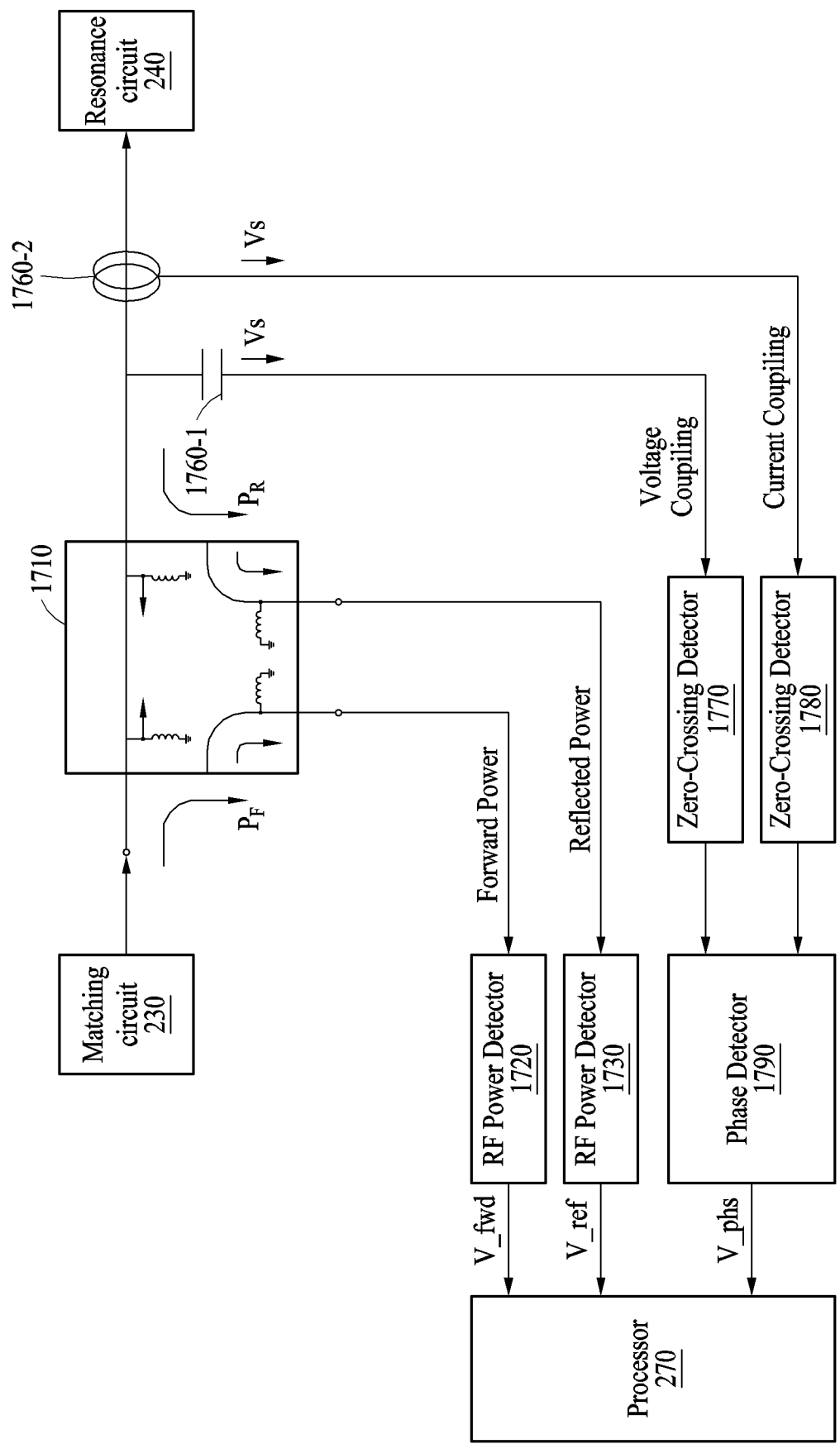

According to various embodiments, in the example illustrated in FIG. 17C, the impedance sensor 1700 may include a directional coupler 1710, the RF power detectors 1720 and 1730, a capacitor 1760-1, a Hall sensor 1760-2, zero-crossing detectors 1770 and 1780, and a phase detector 1790. The VSWR described with reference to FIG. 17A relates to the magnitude of the impedance of the resonance circuit 240, so in the example illustrated in FIG. 17A, the processor 270 may not calculate the phase of the impedance of the resonance circuit 240. In the example illustrated in FIG. 17C, the processor 270 may calculate the magnitude of the impedance of the resonance circuit 240 through the VSWR and calculate the phase of the impedance of the resonance circuit 240 through a voltage value V_phs received from the phase detector 1790. Accordingly, the processor 270 may more accurately calculate the impedance of the resonance circuit 240 and more accurately calculate a variation in the impedance of the resonance circuit 240. Hereinafter, the example illustrated in FIG. 17C is described.

Figure 17D:
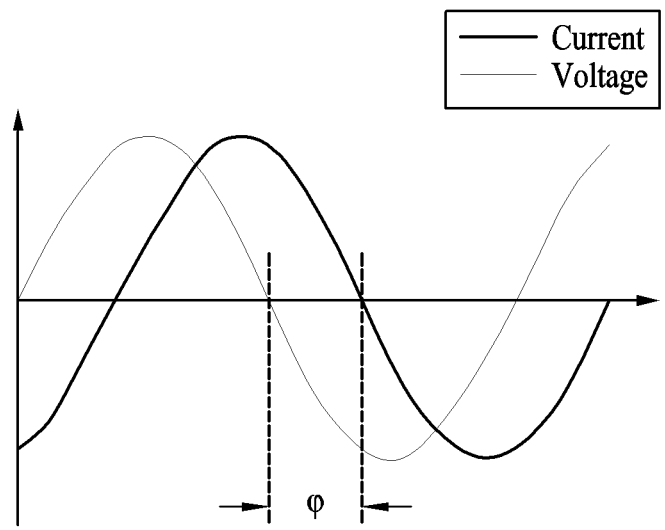
Figure 17E:
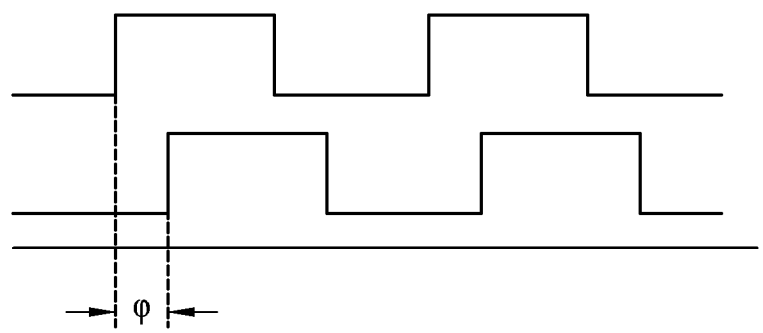

According to various embodiments, the capacitor 1760-1 may sense a voltage supplied to the resonance circuit 240, and the sensed voltage $V_s$ may be input into the zero-crossing detector 1770. The Hall sensor 1760-2 may sense a current supplied to the resonance circuit 240, and the sensed current $I_s$ may be input into the zero-crossing detector 1780. FIG. 17D illustrates the waveform of each of the sensed voltage $V_s$ and the sensed current $I_s$, while FIG. 17E illustrates the detection result of each of the zero-crossing detectors 1770 and 1780. As illustrated in FIG. 17D and FIG. 17E, the sensed voltage $V_s$ and the sensed current $I_s$ may have a phase difference ($\varphi$).

According to various embodiments, the phase detector 1790 may receive a detection result of each of the zero-crossing detectors 1770 and 1780 from each of the zero-crossing detectors 1770 and 1780 and generate the voltage value V_phs based on the respective detection results of the zero-crossing detectors 1770 and 1780.

According to various embodiments, the processor 270 may receive the voltage value V_phs from the phase detector 1790 and obtain a phase difference ($\varphi$) corresponding to the voltage value V_phs with reference to a provided table (or a mapping relationship between each of the voltage values and each of the phase differences). The processor 270 may calculate the phase of the impedance of the resonance circuit 240 based on the obtained phase difference ($\varphi$).

According to various embodiments, the processor 270 may calculate the magnitude of the impedance of the resonance circuit 240.

According to various embodiments, the processor 270 may calculate the impedance of the resonance circuit 240 through the phase and magnitude of the impedance of the resonance circuit 240. The processor 270 may calculate a variation (e.g., the difference between the impedance of the resonance circuit 240 before the wireless power reception device 120 is positioned in the wireless charging space and the impedance of the resonance circuit 240 after the wireless power reception device 120 is positioned in the wireless charging space) in the impedance of the resonance circuit 240 by calculating the impedance of the resonance circuit 240 and may generate a voltage value corresponding to the calculated impedance variation. The processor 270 may calculate the difference value between the reference voltage value and the generated voltage value, determine the control information of the motor 280 based on the calculated difference value, and move the magnetic body (e.g., the magnetic body 310 and the magnetic body 910) by driving the motor 280 through the determined control information.

Figure 18A:
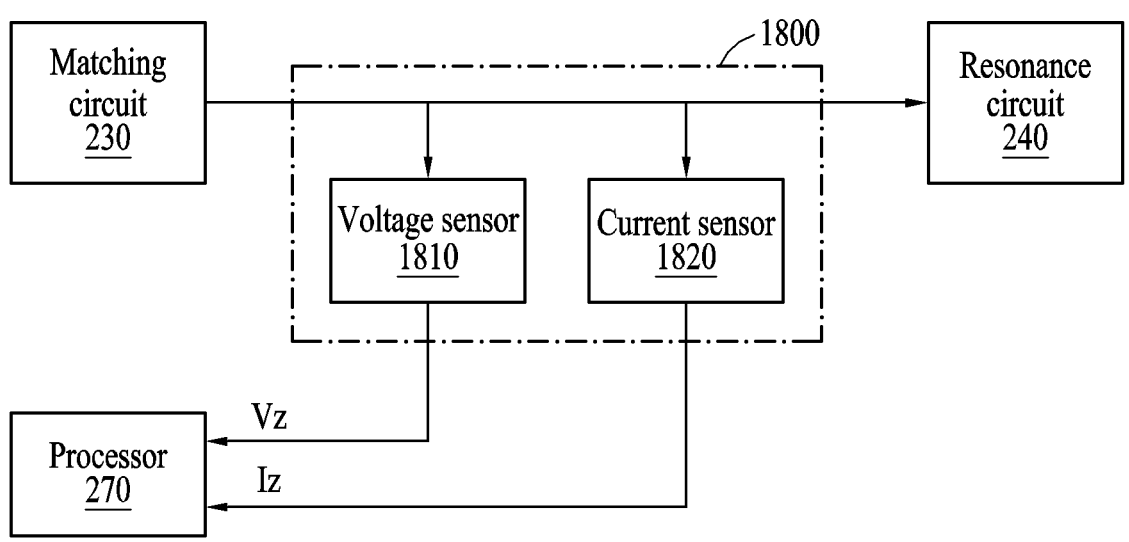

According to various embodiments, in the example illustrated in FIG. 18A, an impedance sensor 1800 may include a voltage sensor 1810 and a current sensor 1820. The voltage sensor 1810 may measure the magnitude of the voltage (e.g., AC voltage) supplied to the resonance circuit 240 and transmit the measured value $V_z$ to the processor 270. The current sensor 1820 may measure the magnitude of the current (e.g., AC current) supplied to the resonance circuit 240 and transmit the measured value $I_z$ to the processor 270.

According to various embodiments, the processor 270 may calculate the magnitude of the impedance of the resonance circuit 240 using the measured value $V_z$ and the measured value $I_z$. The processor 270 may calculate a variation (e.g., the difference between the magnitude of the impedance of the resonance circuit 240 before the wireless power reception device 120 is positioned in a wireless charging space and the magnitude of the impedance of the resonance circuit 240 after the wireless power reception device 120 is positioned in the wireless charging space) in the magnitude of the impedance of the resonance circuit 240 by calculating the magnitude of the impedance of the resonance circuit 240. The processor 270 may generate a voltage value corresponding to the calculated variation. The processor 270 may calculate the difference value between the reference voltage value and the generated voltage value, determine the control information of the motor 280 based on the calculated difference value, and move the magnetic body (e.g., the magnetic body 310 and the magnetic body 910) by driving the motor 280 through the determined control information.

Figure 18B:
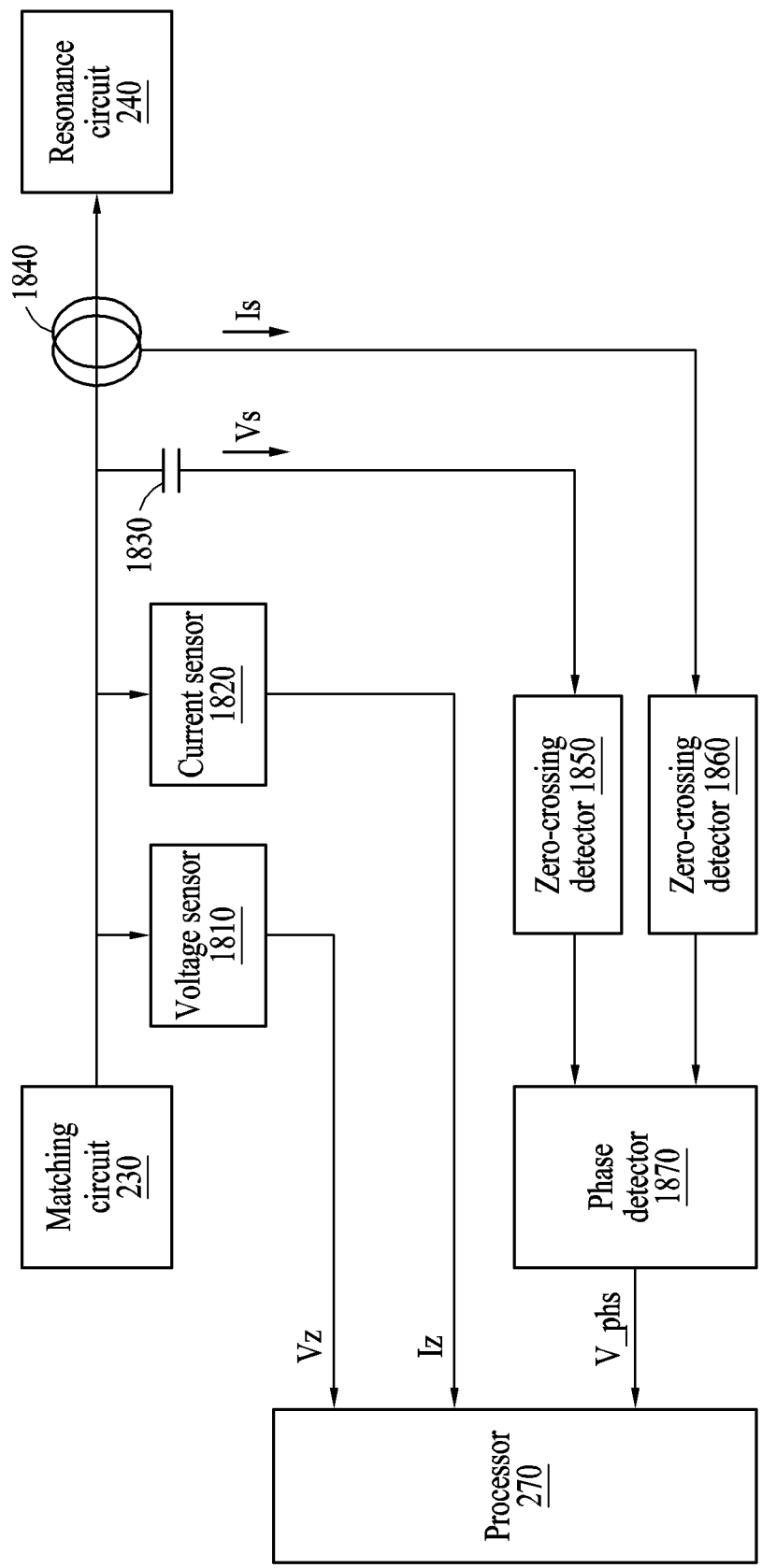

According to various embodiments, in the example illustrated in FIG. 18B, the impedance sensor 1800 may include a voltage sensor 1810, a current sensor 1820, a capacitor 1830, a Hall sensor 1840, zero-crossing detectors 1850 and 1860, and a phase detector 1870. The description of each of the capacitor 1760-1, the Hall sensor 1760-2, the zero-crossing detectors 1770 and 1780, and the phase detector 1790 of FIG. 17C may apply to the description of each of the capacitor 1830, the Hall sensor 1840, the zero-crossing detectors 1850 and 1860, and the phase detector 1870 of FIG. 18B.

According to various embodiments, in the example illustrated in FIG. 18B, the processor 270 may calculate the magnitude of the impedance of the resonance circuit 240 using the voltage value $V_z$ and the current value $I_z$ and calculate the phase of the impedance of the resonance circuit 240 based on a phase difference ($\varphi$) corresponding to the voltage value V_phs. The processor 270 may calculate the impedance of the resonance circuit 240 through the phase and magnitude of the impedance of the resonance circuit 240. The processor 270 may calculate a variation (e.g., the difference between the impedance of the resonance circuit 240 before the wireless power reception device 120 is positioned in the wireless charging space and the impedance of the resonance circuit 240 after the wireless power reception device 120 is positioned in the wireless charging space) in the impedance of the resonance circuit 240 by calculating the impedance of the resonance circuit 240 and may generate a voltage value corresponding to the calculated impedance variation. The processor 270 may calculate the difference value between the reference voltage value and the generated voltage value, determine the control information of the motor 280 based on the calculated difference value, and move the magnetic body (e.g., the magnetic body 310 and the magnetic body 910) by driving the motor 280 through the determined control information.

Figure 19:
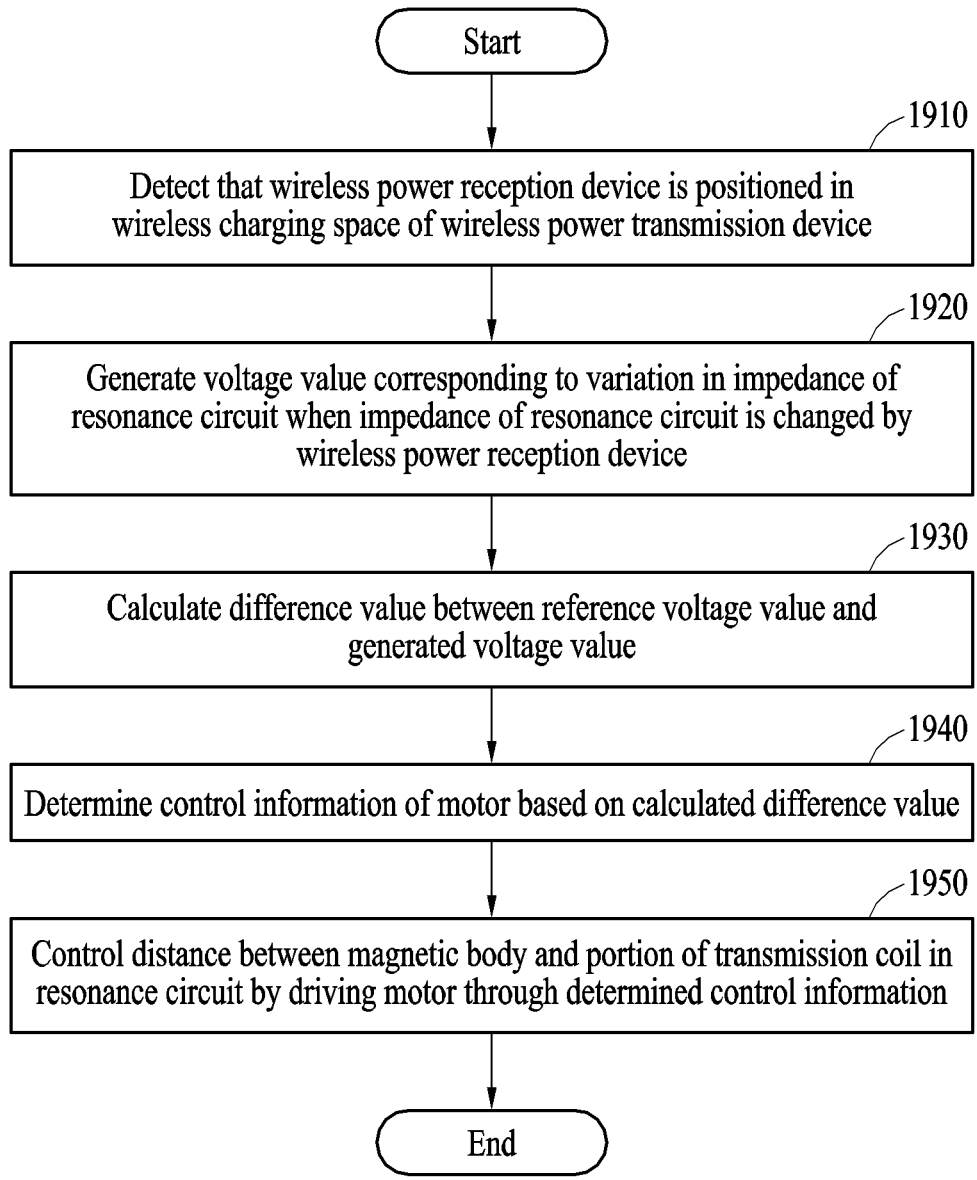
FIG. 19 is a flowchart illustrating an operating method of a wireless power transmission device, according to an embodiment of the disclosure.

FIG. 19 is a flowchart illustrating an operating method of a wireless power transmission device, according to an embodiment of the disclosure.

In operation 1910, the wireless power transmission device 110 may detect that the wireless power reception device 120 is positioned in a wireless charging space of the wireless power transmission device 110.

In operation 1920, when the impedance of the resonance circuit 240 is changed by the wireless power reception device 120, the wireless power transmission device 110 may generate a voltage value corresponding to the change in the impedance of the resonance circuit 240.

In operation 1930, the wireless power transmission device 110 may calculate the difference value between a reference voltage value and the generated voltage value.

In operation 1940, the wireless power transmission device 110 may determine control information of the motor 280 based on the calculated difference value.

In operation 1950, the wireless power transmission device 110 may control the distance between the magnetic body 290 and a portion of the transmission coil 240-1 in the resonance circuit 240 by driving the motor 280 through the determined control information.

The description provided with reference to FIGS. 1 to 6, 7A, 7B, 8A, 8B, 9 to 11, 12A to 12C, 13, 14A to 14D, 15A to 15C, 16A to 16C, 17A to 17E, 18A, and 18B may apply to the description of FIG. 19, and thus, a detailed description thereof is omitted.

According to various embodiments, the wireless power transmission device 110 may include a transmission coil (e.g., the transmission coil 400 of FIG. 4) including a first member (e.g., the first member 410 of FIG. 4) forming a first angle with a plane and a second member (e.g., the second member 420 of FIG. 4) disposed on the plane and connected to each of one end and the other end of the first member, a resonance circuit (e.g., the resonance circuit 240 of FIG. 2) including the transmission coil and a capacitor connected to the transmission coil in series and/or parallel, an impedance sensor (e.g., the impedance sensor 260-1 of FIG. 2) configured to detect impedance based on a voltage and a current measured at a first point of the wireless power transmission device, a magnetic body (e.g., the magnetic body 910 of FIG. 9) having a dented side surface facing a portion of the transmission coil, a motor (e.g., the motor 280 of FIG. 2) configured to move the magnetic body, and a processor (e.g., the processor 270 of FIG. 2) configured to receive, from the impedance sensor, the detected impedance as a voltage value, calculate the difference value between a reference voltage value and the received voltage value, determine control information of the motor based on the calculated difference value, and control the distance between the magnetic body and the portion of the transmission coil by driving the motor through the determined control information.

According to various embodiments, the processor may determine the rotation direction of the motor by determining whether the calculated difference value is a negative number or a positive number and determine the number of rotations of the motor using the magnitude of the calculated difference value.

According to various embodiments, the processor may determine the control information such that the distance decreases when the calculated difference value has a first sign and determine the control information such that the distance increases when the calculated difference value has a second sign.

According to various embodiments, as the magnetic body is moved by the motor, impedance matching may occur in the resonance circuit.

According to various embodiments, the dented side surface may have a U shape.

According to various embodiments, the magnetic body may wrap the portion of the transmission coil.

According to various embodiments, the first member may have a U shape and the second member may have a loop shape.

According to various embodiments, the impedance sensor may output a first voltage value of power supplied to the resonance circuit and a second voltage value of reflected power reflected by the resonance circuit. The processor may calculate a variation in the magnitude of the impedance of the resonance circuit based on the output first and second voltage values, calculate a second difference value between a reference voltage value and a voltage value corresponding to the calculated variation, determine control information of the motor based on the calculated second difference value, and control the motor based on the determined control information.

According to various embodiments, the impedance sensor may output a first measured value obtained by measuring the magnitude of a current supplied to the resonance circuit and a second measured value obtained by measuring the magnitude of a voltage supplied to the resonance circuit. The processor may calculate a variation in the magnitude of the impedance of the resonance circuit based on the output first and second measured values, calculate a third difference value between a reference voltage value and a voltage value corresponding to the calculated variation, determine control information of the motor based on the calculated third difference value, and control the motor based on the determined control information.

According to various embodiments, the wireless power transmission device 110 may include a resonance circuit (e.g., the resonance circuit 240 of FIG. 2) including a capacitor and a transmission coil (e.g., the transmission coil 400 of FIG. 4) configured to transmit wireless power to the wireless power reception device 120 (here, the transmission coil may include a first member (e.g., the first member 410 of FIG. 4) forming a first angle with a plane and a second member (e.g., the second member 420 of FIG. 4) disposed on the plane and connected to each of one end and the other end of the first member), an impedance sensor (e.g., the impedance sensor 1700 of FIG. 17A) configured to output a first voltage value (e.g., the voltage value V_fwd of FIG. 17A) of power supplied to the resonance circuit and a second voltage value (e.g., the voltage value V_ref of FIG. 17A) of reflected power reflected by the resonance circuit, a magnetic body (e.g., the magnetic body 910 of FIG. 9) having a dented side surface facing a portion of the transmission coil, a motor (e.g., the motor 280 of FIG. 2) configured to move the magnetic body, and a processor (e.g., the processor 270 of FIG. 2) configured to calculate a variation in the magnitude of the impedance of the resonance circuit based on the output first and second voltage values, calculate the difference value between a reference voltage value and a voltage value corresponding to the calculated variation, determine control information of the motor based on the calculated difference value, and control the motor based on the determined control information.

According to various embodiments, the processor may determine the rotation direction of the motor by determining whether the calculated difference value is a negative number or a positive number and determine the number of rotations of the motor using the magnitude of the calculated difference value.

According to various embodiments, the processor may determine the control information such that the distance decreases when the calculated difference value has a first sign and determine the control information such that the distance increases when the calculated difference value has a second sign.

According to various embodiments, as the magnetic body is moved by the motor, impedance matching may occur in the resonance circuit.

According to various embodiments, the wireless power transmission device 110 may include a resonance circuit (e.g., the resonance circuit 240 of FIG. 2) including a capacitor and a transmission coil (e.g., the transmission coil 400 of FIG. 4) configured to transmit wireless power to the wireless power reception device 120 (here, the transmission coil may include a first member (e.g., the first member 410 of FIG. 4) forming a first angle with a plane and a second member (e.g., the second member 420 of FIG. 4) disposed on the plane and connected to each of one end and the other end of the first member), an impedance sensor (e.g., the impedance sensor 1800 of FIG. 18A) configured to output a first measured value (e.g., the measured value $I_z$ of FIG. 18A) obtained by measuring the magnitude of a current supplied to the resonance circuit and a second measured value (e.g., the measured value $V_z$ of FIG. 18A) obtained by measuring the magnitude of a voltage supplied to the resonance circuit, a magnetic body (e.g., the magnetic body 910 of FIG. 9) having a dented side surface facing a portion of the transmission coil, a motor (e.g., the motor 280 of FIG. 2) configured to move the magnetic body, and a processor (e.g., the processor 270 of FIG. 2) configured to calculate a variation in the magnitude of the impedance of the resonance circuit based on the output first and second voltage values, calculate the difference value between a reference voltage value and a voltage value corresponding to the calculated variation, determine control information of the motor based on the calculated difference value, and control the motor based on the determined control information.

According to various embodiments, an operating method of the wireless power transmission device 110 may include generating a voltage value corresponding to a variation in the impedance of the resonance circuit when a wireless power reception device is positioned in a wireless charging space of the wireless power transmission device and the impedance of the resonance circuit of the wireless power transmission device is changed by the wireless power reception device, calculating the difference value between a reference voltage value and the generated voltage value, determining control information of a motor based on the calculated difference value, and controlling the distance between a magnetic body and a portion of the transmission coil in the resonance circuit by driving the motor through the determined control information.

According to various embodiments, the transmission coil may include a first member having one end and the other end, each forming a first angle with a plane, and a second member disposed on the plane and connected to the first member. The magnetic body may have a dented side surface facing the portion of the transmission coil.

According to various embodiments, the determining of the control information may include determining the rotation direction of the motor by determining whether the calculated difference value is a negative number or a positive number and determining the number of rotations of the motor using the calculated difference value.

According to various embodiments, the determining of the control information may include determining the control information such that the distance decreases when the calculated difference value has a first sign and determining the control information such that the distance increases when the calculated difference value has a second sign.

The embodiments described herein may be implemented using a hardware component, a software component, and/or a combination thereof. For example, the device, the method, and the components described in the embodiments may be implemented using general-purpose or special-purpose computers, such as, for example, a processor, a controller and an arithmetic logic unit (ALU), a digital signal processor (DSP), a microcomputer, a field-programmable gate array (FPGA), a programmable logic unit (PLU), a microprocessor, or any other device capable of responding to and executing instructions in a defined manner. A processing device may run an operating system (OS) and one or more software applications that run on the OS. The processing device may also access, store, manipulate, process, and create data in response to execution of the software. For purpose of simplicity, the description of a processing device is singular; however, one of ordinary skill in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or one or more combinations thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter.

The above-described hardware devices may be configured to act as one or more software modules in order to perform the operations of the above-described embodiments, or vice versa.

As described above, although the embodiments have been described with reference to the limited drawings, one of ordinary skill in the art may apply various technical modifications and variations based thereon. For example, suitable results may be achieved if the described techniques are performed in a different order, and/or if components in a described system, architecture, device, or circuit are combined in a different manner, or replaced or supplemented by other components or their equivalents.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device individually or collectively, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A wireless power transmission device comprising:
   a transmission coil comprising a first member forming a first angle with a plane and a second member disposed on the plane and connected to each of one end and another end of the first member;
   a resonance circuit comprising the transmission coil and a capacitor connected to the transmission coil in series or parallel;
   an impedance sensor configured to detect impedance based on a voltage and a current measured at a first point of the wireless power transmission device;
   a magnetic body having a dented side surface facing a portion of the transmission coil;
   a motor configured to move the magnetic body;
   memory storing one or more computer programs; and
   one or more processors communicatively coupled to the memory,
   wherein the one or more computer programs include computer-executable instructions that, when executed by the one or more processors individually or collectively, cause the wireless power transmission device to:
      receive, from the impedance sensor, the detected impedance as a voltage value,
      calculate a difference value between a reference voltage value and the received voltage value,
      determine control information of the motor based on the calculated difference value, and
      control a distance between the magnetic body and the portion of the transmission coil by driving the motor through the determined control information.

2. The wireless power transmission device of claim 1, wherein the one or more computer programs further include computer-executable instructions that, when executed by the one or more processors individually or collectively, cause the wireless power transmission device to:
   determine a rotation direction of the motor by determining whether the calculated difference value is a negative number or a positive number; and
   determine a number of rotations of the motor using a magnitude of the calculated difference value.

3. The wireless power transmission device of claim 1, wherein the one or more computer programs further include computer-executable instructions that, when executed by the one or more processors individually or collectively, cause the wireless power transmission device to:
   determine the control information such that the distance decreases when the calculated difference value has a first sign; and
   determine the control information such that the distance increases when the calculated difference value has a second sign.

4. The wireless power transmission device of claim 1, wherein impedance matching occurs in the resonance circuit as the magnetic body is moved by the motor.

5. The wireless power transmission device of claim 1, wherein the dented side surface has a U shape.

6. The wireless power transmission device of claim 5, wherein the magnetic body is configured to wrap the portion of the transmission coil.

7. The wireless power transmission device of claim 1, wherein the first member has a U shape, and the second member has a loop shape.

8. The wireless power transmission device of claim 1,
   wherein the impedance sensor is further configured to output a first voltage value of a current supplied to the resonance circuit and a second voltage value of a reflective current reflected by the resonance circuit, and
   wherein the one or more computer programs further include computer-executable instructions that, when executed by the one or more processors individually or collectively, cause the wireless power transmission device to:

calculate a variation in a magnitude of impedance of the resonance circuit based on the output first and second voltage values, calculate a second difference value between a reference voltage value and a voltage value corresponding to the calculated variation, determine control information of the motor based on the calculated second difference value, and control the motor based on the determined control information.

9. The wireless power transmission device of claim 1, wherein the impedance sensor is further configured to output a first measured value obtained by measuring a magnitude of a current supplied to the resonance circuit and a second measured value obtained by measuring a magnitude of a voltage supplied to the resonance circuit, and wherein the one or more computer programs further include computer-executable instructions that, when executed by the one or more processors individually or collectively, cause the wireless power transmission device to:

calculate a variation in a magnitude of impedance of the resonance circuit based on the output first and second measured values, calculate a third difference value between a reference voltage value and a voltage value corresponding to the calculated variation, determine control information of the motor based on the calculated third difference value, and control the motor based on the determined control information.

10. An operating method of a wireless power transmission device, the operating method comprising:

based on a wireless power reception device being positioned in a wireless charging space of the wireless power transmission device and impedance of a resonance circuit of the wireless power transmission device is changed by the wireless power reception device, generating a voltage value corresponding to a change in the impedance of the resonance circuit;

calculating a difference value between a reference voltage value and the generated voltage value;

determining control information of a motor based on the calculated difference value; and controlling a distance between a magnetic body and a portion of a transmission coil in the resonance circuit by driving the motor through the determined control information, wherein the transmission coil comprises a first member having one end and another end, each forming a first angle with a plane, and a second member disposed on the plane and connected to the first member, and wherein the magnetic body has a dented side surface facing the portion of the transmission coil.

11. The operating method of claim 10, wherein the determining of the control information comprises:

determining a rotation direction of the motor by determining whether the calculated difference value is a negative number or a positive number; and determining a number of rotations of the motor using a magnitude of the calculated difference value.

12. The operating method of claim 10, wherein the determining of the control information comprises determining the control information such that the distance decreases when the calculated difference value has a first sign and determining the control information such that the distance increases when the calculated difference value has a second sign.

13. The operating method of claim 10, wherein impedance matching occurs in the resonance circuit as the magnetic body is moved by the motor.

14. The operating method of claim 10, wherein the dented side surface has a U shape.

15. The operating method of claim 10, wherein the magnetic body is configured to wrap the portion of the transmission coil.

16. The operating method of claim 10, wherein the first member has a U shape, and the second member has a loop shape.

17. The operating method of claim 10, further comprising:

outputting a first voltage value of a current supplied to the resonance circuit and a second voltage value of a reflective current reflected by the resonance circuit;

calculating a variation in a magnitude of impedance of the resonance circuit based on the output first and second voltage values;

calculating a second difference value between a reference voltage value and a voltage value corresponding to the calculated variation;

determining control information of the motor based on the calculated second difference value; and controlling the motor based on the determined control information.

18. The operating method of claim 10, further comprising:

outputting a first measured value obtained by measuring a magnitude of a current supplied to the resonance circuit and a second measured value obtained by measuring a magnitude of a voltage supplied to the resonance circuit, and calculating a variation in a magnitude of impedance of the resonance circuit based on the output first and second measured values, calculating a third difference value between a reference voltage value and a voltage value corresponding to the calculated variation, determining control information of the motor based on the calculated third difference value, and controlling the motor based on the determined control information.

19. One or more non-transitory computer-readable storage media storing one or more computer programs including computer-executable instructions that, when executed by one or more processors of an electronic device individually or collectively, cause the electronic device to perform operations, the operations comprising:

when based on a wireless power reception device being positioned in a wireless charging space of a wireless power transmission device and impedance of a resonance circuit of the wireless power transmission device is changed by the wireless power reception device, generating a voltage value corresponding to a change in the impedance of the resonance circuit;

calculating a difference value between a reference voltage value and the generated voltage value;

determining control information of a motor based on the calculated difference value; and controlling a distance between a magnetic body and a portion of a transmission coil in the resonance circuit by driving the motor through the determined control information, wherein the transmission coil comprises a first member having one end and another end, each forming a first angle with a plane, and a second member disposed on the plane and connected to the first member, and wherein the magnetic body has a dented side surface facing the portion of the transmission coil.

20. The one or more non-transitory computer-readable storage media of claim 19, the operations further comprising:

determining a rotation direction of the motor by determining whether the calculated difference value is a negative number or a positive number; and determining a number of rotations of the motor using a magnitude of the calculated difference value.

* * * * *